United States Patent
Yu

(10) Patent No.: US 9,768,916 B2
(45) Date of Patent: Sep. 19, 2017

(54) METHOD FOR DETECTING SIGNAL IN COMMUNICATION SYSTEM AND SIGNAL RECEIVING APPARATUS THEREOF

(71) Applicant: Samsung Electronics Co., Ltd., Gyeonggi-do (KR)

(72) Inventor: Hyun-Seok Yu, Seoul (KR)

(73) Assignee: Samsung Electronics Co., Ltd (KR)

( * ) Notice: Subject to any disclaimer, the term of this patent is extended or adjusted under 35 U.S.C. 154(b) by 119 days.

(21) Appl. No.: 14/750,445

(22) Filed: Jun. 25, 2015

(65) Prior Publication Data
US 2016/0080054 A1    Mar. 17, 2016

(30) Foreign Application Priority Data
Sep. 11, 2014    (KR) .......................... 10-2014-0119960

(51) Int. Cl.
*H04B 7/04*    (2017.01)
*H03J 3/16*    (2006.01)
(Continued)

(52) U.S. Cl.
CPC ......... *H04L 1/0668* (2013.01); *H04B 7/0456* (2013.01); *H04B 7/0854* (2013.01); *H04L 25/02* (2013.01)

(58) Field of Classification Search
CPC ........ H04J 13/00; H04J 13/0003; H04J 13/16; H04L 1/06; H04L 1/0668; H04L 1/20;
(Continued)

(56) References Cited

U.S. PATENT DOCUMENTS

| 6,879,578 B2 * | 4/2005 | Pan | H04B 1/71052 370/210 |
| 7,103,092 B2 * | 9/2006 | Zeira | H04B 1/71052 370/342 |

(Continued)

FOREIGN PATENT DOCUMENTS

JP    2007-221317    8/2007

OTHER PUBLICATIONS

Jürgen et al.,"Efficient Joint Detection Techniques for TD-CDMA in the Frequency Domain"; 2000; 1. Dept. of Electrical Engineering, Information Processing Lab, University of Dortmund, Otto-Hahn-Str. 4; 2. Siemens AG, ICN CA CTO 7, Mobile Communication, Chief Technical Office, Hofmannstr. 51; 2000, pp. 1-5.*

(Continued)

*Primary Examiner* — Tri H Phan
(74) *Attorney, Agent, or Firm* — The Farrell Law Firm, P.C.

(57) ABSTRACT

A method for detecting a signal by a signal receiving apparatus is provided. The method includes detecting a part of block diagonal matrices included in a diagonal matrix based on at least one channel impulse response (CIR) for a received signal, detecting remaining block diagonal matrices excluding the part of block diagonal matrices from among block diagonal matrices included in the diagonal matrix, estimating modulation symbols from the received signal based on the diagonal matrix, generating a block diagonal matrix by multiplying one of second matrices included in a first matrix, which is generated by applying a circular extension scheme to a fourth matrix including third matrices, by a fast Fourier transform (FFT) matrix, generating a third matrix for one of the estimated modulation symbols, the third matrix includes vectors for channelization codes, (Continued)

and generating a vector based on the channelization codes or the at least one CIR.

18 Claims, 18 Drawing Sheets

(51) Int. Cl.
*H04L 1/06* (2006.01)
*H04J 13/00* (2011.01)
*H04L 25/02* (2006.01)
*H04B 7/0456* (2017.01)
*H04B 7/08* (2006.01)

(58) Field of Classification Search
CPC  H04L 5/00; H04L 25/02; H04L 27/26; H04B 7/04; H04B 7/0456; H04B 7/0473; H04B 7/0854
See application file for complete search history.

(56) References Cited

U.S. PATENT DOCUMENTS

| | | | | |
|---|---|---|---|---|
| 7,336,599 B2* | 2/2008 | Hwang | ............... | H04B 1/71052 370/208 |
| 7,447,255 B2* | 11/2008 | De | ................ | H04B 1/7105 375/147 |
| 7,539,262 B2* | 5/2009 | Pan | ................ | H04B 1/71052 375/267 |
| 8,169,978 B2* | 5/2012 | Sheng | ................ | H04L 25/03159 370/335 |
| 9,065,694 B2* | 6/2015 | Siti | ................ | H04L 25/0204 |
| 9,401,783 B1* | 7/2016 | Agee | ................ | H04B 7/0413 |
| 2002/0048333 A1* | 4/2002 | Ahmed | ............ | H04L 25/03159 375/346 |
| 2004/0052236 A1* | 3/2004 | Hwang | ............... | H04B 1/71052 370/342 |
| 2004/0131010 A1* | 7/2004 | Pan | ................ | H04B 1/71052 370/210 |
| 2006/0126568 A1* | 6/2006 | Pan | ................ | H04B 1/71052 370/335 |
| 2006/0274708 A1* | 12/2006 | Estraviz | ............... | H04L 1/0668 370/342 |
| 2008/0080638 A1 | 4/2008 | Yan et al. | | |
| 2009/0109947 A1* | 4/2009 | Sheng | ................ | H04L 25/03159 370/342 |

OTHER PUBLICATIONS

Xuezhi Yang et al. "A Frequency Domain Multi-User Detector for TD-CDMA Systems", IEEE Transactions on Communications, p. 2424, vol. 59, No. 9, Sep. 2011.

* cited by examiner

METHOD FOR DETECTING SIGNAL IN COMMUNICATION SYSTEM AND SIGNAL RECEIVING APPARATUS THEREOF

PRIORITY

This application claims priority under 35 U.S.C. §119(a) to Korean Patent Application Serial No. 10-2014-0119960, which was filed in the Korean Intellectual Property Office on Sep. 11, 2014, the entire disclosure of which is incorporated herein by reference.

BACKGROUND

1. Field of the Disclosure

The present disclosure relates generally to an apparatus and method for detecting a signal in a communication system supporting a time division duplexing-code division multiple access (TDD-CDMA) scheme, and more particularly, the present disclosure relates to an apparatus and method for decreasing processing complexity in a communication system supporting a TDD-CDMA scheme.

2. Description of the Related Art

Communication systems have evolved to support a high data rate in order to satisfy a demand for wireless data traffic, which continuously increases. For example, a communication system has evolved to enhance spectral efficiency and increase channel capacity based on various schemes, such as an orthogonal frequency division multiplexing (OFDM) scheme, a multiple-input multiple-output (MIMO) scheme, and the like, in order to increase a data rate.

Cell edge mobile stations (MSs) which are located at a cell edge region, which is far from a cell center in which a signal-to-noise ratio (SNR) is low or a carrier-to-interference and noise ratio (CINR) is low due to the significant impact of an interference from a base station (BS), which is located at a neighbor cell, may decrease system performance of the communication system.

In communication systems, various schemes such as an inter-cell interference-coordination (ICIC) scheme, a coordinated multi-points (CoMP) scheme, an interference cancellation scheme, and the like have been developed in order to increase transmission efficiency for the MSs that are located at the cell edge.

For example, in a communication system supporting a CDMA scheme, various interference cancellation schemes have been used, and typical schemes include a parallel interference cancellation (PIC) scheme, a serial interference cancellation (SIC) scheme, and a joint detection (JD) scheme. Each of the PIC scheme and the SIC scheme is a non-linear interference cancellation scheme, and the JD scheme is a linear interference cancellation scheme.

Generally, performance of a signal detector is proportional to processing complexity and processing computation amount. The greater a requirement for the performance of the signal detector is, the greater is the complexity for implementing the signal detector. Thus, it is very important in a communication system for the signal detector to be implemented with low complexity.

Recently, with respect to communication systems supporting a CDMA scheme and a communication system supporting time division-synchronous code division multiple access (TD-SCDMA), a signal detector has been implemented using a joint detector which is implemented by using a JD scheme. The joint detector models a receiving system as one linear matrix system based on a multi-code received signal and a channel estimation result, and detects an optimal received symbol by detecting a linear minimum mean square error (LMMSE) solution in the modeled linear matrix system.

A signal detection scheme which is based on the JD scheme in a communication system supporting the TD-SCDMA scheme will be described below.

For modeling the JD scheme, the following will be assumed.

A signal received in a radio frequency (RF) integrated circuit (IC) is output to an analog to digital converter (ADC) converter, and the ADC samples the signal received in the RF IC to generate a digital signal. The ADC over-samples the signal received in the RF IC N times, e.g., twice, and it will be assumed that the signal sampled in the ADC has a rate of chip×2.

In the communication system supporting the TD-SCDMA scheme, it will be assumed that signal receiving apparatuses, e.g., MSs, use a plurality of receiving antennas, e.g., two receiving antennas.

It will be assumed that the communication system supporting the TD-SCDMA scheme may support K channelization codes. Further, it will be assumed that the kth channelization code from among the K channelization codes is $c^{(k)}$, and channel impulse responses (CIRs) for two antenna paths which are estimated from a channel estimator included in a signal receiving apparatus are $h_0$ and $h_1$. If the signal receiving apparatus uses two antennas such as an antenna #0 and an antenna #1, a CIR for an antenna path for the antenna #0 is $h_0$, and a CIR for an antenna path for the antenna #1 is $h_1$.

The kth channelization code $c^{(k)}$ may be expressed using Equation (1):

$$c^{(k)}=[c_0^{(k)},c_1^{(k)},\ldots,c_{2Q-1}^{(k)}] \quad (1)$$

In Equation (1), Q denotes a spreading factor, and $c_{2Q-1}^{(k)}$ denotes a channelization code element included in the kth channelization code $c^{(k)}$. That is, the kth channelization code $c^{(k)}$ includes 2Q channelization code elements.

The CIR $h_0$ may be expressed using Equation (2):

$$h_0=[h_{0,0},h_{0,1}\ldots,h_{0,2W-1}] \quad (2)$$

In Equation (2), W denotes a tap length of a related CIR, and $h_{0,2W-1}$ denotes a CIR element included in the CIR $h_0$. That is, the CIR $h_0$ includes 2W CIR elements.

The CIR $h_1$ may be expressed using Equation (3):

$$h_1=[h_{1,0},h_{1,1}\ldots,h_{1,2W-1}] \quad (3)$$

In Equation (3), $h_{1,2W-1}$ denotes a CIR element included in the CIR $h_1$. That is, the CIR $h_1$ includes 2W CIR elements.

It will be assumed that a data symbol which a signal transmitting apparatus, e.g., a BS, transmits is d, and a received signal vector in which a Gaussian noise is extracted is x. One data block includes at least one data symbol. It will be assumed that the number of modulation symbols which are transmitted based on each channelization code in one data block, e.g., quadrature amplitude modulation (QAM) symbols, is N. In this case, the number of QAM symbols included in one data block is K*N.

The data symbol d may be expressed using Equation (4):

$$d=[d_0^{(0)},d_0^{(1)},\ldots,d_0^{(K-1)},d_1^{(0)},\ldots,d_{N-1}^{(K-1)}]^T \quad (4)$$

In Equation (4), $d_n^{(k)}$ denotes a data symbol element included in a data symbol. That is, one data symbol includes K*N data symbol elements. So, a data symbol element becomes a QAM symbol in Equation (4). In Equation (4), T denotes a transpose.

The received signal vector x may be expressed using Equation (5):

$$x = [x_{0,0}, x_{1,0}, \ldots, x_{1,M(2NQ+2W-1)}]^T \quad (5)$$

In Equation (5), $x_{1,M(2NQ+2W-1)}$ denotes a received signal vector element included in the received signal vector x. That is, the received signal vector x includes $2*M(2NQ+2W)$ received signal vector elements.

A received signal modeling in a case that one channelization code is used in a conventional communication system supporting a TD-SCDMA scheme will be described with reference to FIG. 1.

FIG. 1 is a diagram illustrating a received signal modeling in a case where one channelization code is used in a conventional communication system supporting a TD-SCDMA scheme.

Referring to FIG. 1, in a signal transmitting apparatus, a data symbol element $d_0^{(k)}$ is multiplied by a channelization code $c^{(k)}$, and the multiplied signal is transmitted. A CIR $h_0$ is reflected on the signal transmitted in the signal transmitting apparatus, so a signal receiving apparatus receives a received signal vector element such as $d_0^{(k)}(h_0 * c^{(k)})$.

A transmitted signal modeling in a case where a plurality of channelization codes are used in a conventional communication system supporting a TD-SCDMA scheme will be described with reference to FIG. 2.

FIG. 2 is a diagram illustrating a transmitted signal modeling in a case where a plurality of channelization codes are used in a conventional communication system supporting a TD-SCDMA scheme.

Referring to FIG. 2, a transmitted signal modeling in a case where a plurality of channelization codes, e.g., three channelization codes, are used and the number of QAM symbols, which are transmitted based on each of the three channelization codes is N, is illustrated. It is noted that only 3*3 QAM symbols from among 3*N QAM symbols are illustrated in FIG. 2.

A structure of a matrix V in a conventional communication system supporting a TD-SCDMA scheme will be described with reference to FIG. 3.

FIG. 3 is a diagram illustrating a structure of a matrix V in a conventional communication system supporting a TD-SCDMA scheme.

Referring to FIG. 3, a system equation for a signal detector in the communication system supporting the TD-SCDMA scheme may be defined based on a received signal modeling as described in FIG. 1 and a transmitted signal modeling as described in FIG. 2.

In FIG. 1, a transmitted signal, i.e., a data symbol d, is spread based on a channelization code c, and a convolution computation with a CIR h is performed on a spread data symbol d*c which is generated by spreading the data symbol d based on the channelization code c. A system through which the data symbol d passes is given as a convolution form between the channelization code c and the CIR h, i.e., a vector b. It will be assumed that a vector b for the kth channelization code $c^{(k)}$ is $b^{(k)}$.

So, $b^{(k)}$ for a CIR $h_0$ may be expressed using Equation (6):

$$b_0^{(k)} = h_0 * c^{(k)} = [b_{0,0}^{(k)}, b_{0,1}^{(k)}, \ldots, b_{0,1Q+2W-1}^{(k)}] \quad (6)$$

In Equation (6), 0 denotes the $b^{(k)}$ for the CIR $h_0$.

Further, $b^{(k)}$ for a CIR $h_1$ may be expressed using Equation (7):

$$b_1^{(k)} = h_1 * c^{(k)} = [b_{1,0}^{(k)}, b_{1,1}^{(k)}, \ldots, b_{1,2Q+2W-1}^{(k)}] \quad (7)$$

In Equation (7), $b_1^{(k)}$ denotes the $b^{(k)}$ for the CIR $h_1$.

If the vector $b^{(k)}$ is regarded as one column, vectors b for K channelization codes, i.e., K vectors b, may be included in one matrix, and it will be assumed that the one matrix is a matrix V. In the matrix V, a vector b for an arbitrary channelization code c is generated as one column, so the matrix V includes K columns.

The matrix V is defined for one of N QAM symbols. In order to generate a system matrix for all locations of the N QAM symbols, i.e., all QAM symbols included in one data block, N matrices V for the N QAM are be concatenated by cascading the N matrices V.

It will be assumed that the system matrix which is generated by the matrices V for the N QAM symbols is a matrix T. That is, the matrix T is a matrix including the matrices V which are generated for the N QAM symbols.

In this case, a system equation in which a Gaussian noise is considered may be expressed using Equation (8):

$$Td + n = y \quad (8)$$

In Equation (8), n denotes the Gaussian noise, and y denotes a received signal vector which includes the Gaussian noise n.

A solution for the system equation in which the Gaussian noise is considered as expressed in Equation (8) may be expressed using Equation (9):

$$\hat{d} = (T^H T + \sigma^2 I)^{-1} T^H y \quad (9)$$

In Equation (9), $\hat{d}$ denotes an estimated data symbol, $\sigma$ denotes a covariance of the Gaussian noise n, H denotes Hermitian, and I denotes an identity matrix. That is, the solution for the system equation in which the Gaussian noise is considered is an estimated data symbol $\hat{d}$.

A structure of a matrix T in a conventional communication system supporting a TD-SCDMA scheme will be described with reference to FIG. 4.

FIG. 4 is a diagram illustrating a structure of a matrix T in a conventional communication system supporting a TD-SCDMA scheme.

Referring to FIG. 4, a size of the matrix T is very large, so an operation of detecting a pseudo-inverse matrix of $(T^H T + \sigma^2 I)$ requires a complex processing computation amount, as expressed as Equation (8).

If 16 channelization codes are used and one data block includes 22 QAM symbols in the communication system, the number of columns included in the matrix T is 352 (i.e., 16×22). If it is considered that processing computation amount of an inverse matrix is proportional to a cube of a matrix size, a processing computation amount necessary for processing one data block is greater than or equal to tens of mega flops.

It is impossible to process this processing computation amount using conventional hardware or a digital signal processing (DSP) core. This processing computation amount, however, significantly increases power consumption of a signal receiving apparatus.

Accordingly, there is a need for a scheme of detecting a signal for decreasing processing complexity, processing computation amount, and power consumption.

SUMMARY

The present disclosure has been made to address at least the above-mentioned problems and/or disadvantages and to provide at least the advantages described below. Accordingly, an aspect of the present disclosure is to provide an apparatus and a method for detecting a signal in a communication system supporting a TDD-CDMA scheme.

Another aspect of the present disclosure is to provide an apparatus and a method for detecting a signal for decreasing processing complexity in a communication system supporting a TDD-CDMA scheme, for decreasing processing computation amount in a communication system supporting a TDD-CDMA scheme, for decreasing power consumption in a communication system supporting a TDD-CDMA scheme, and for enhancing performance in a communication system supporting a TDD-CDMA scheme.

Another aspect of the present disclosure is to provide an apparatus and a method for detecting a signal in an environment in which a Doppler frequency is relatively high, in a communication system supporting a TDD-CDMA scheme.

Another aspect of the present disclosure is to provide an apparatus and a method for detecting a signal using a system matrix, which is generated based on an interpolation scheme, in a communication system supporting a TDD-CDMA scheme.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
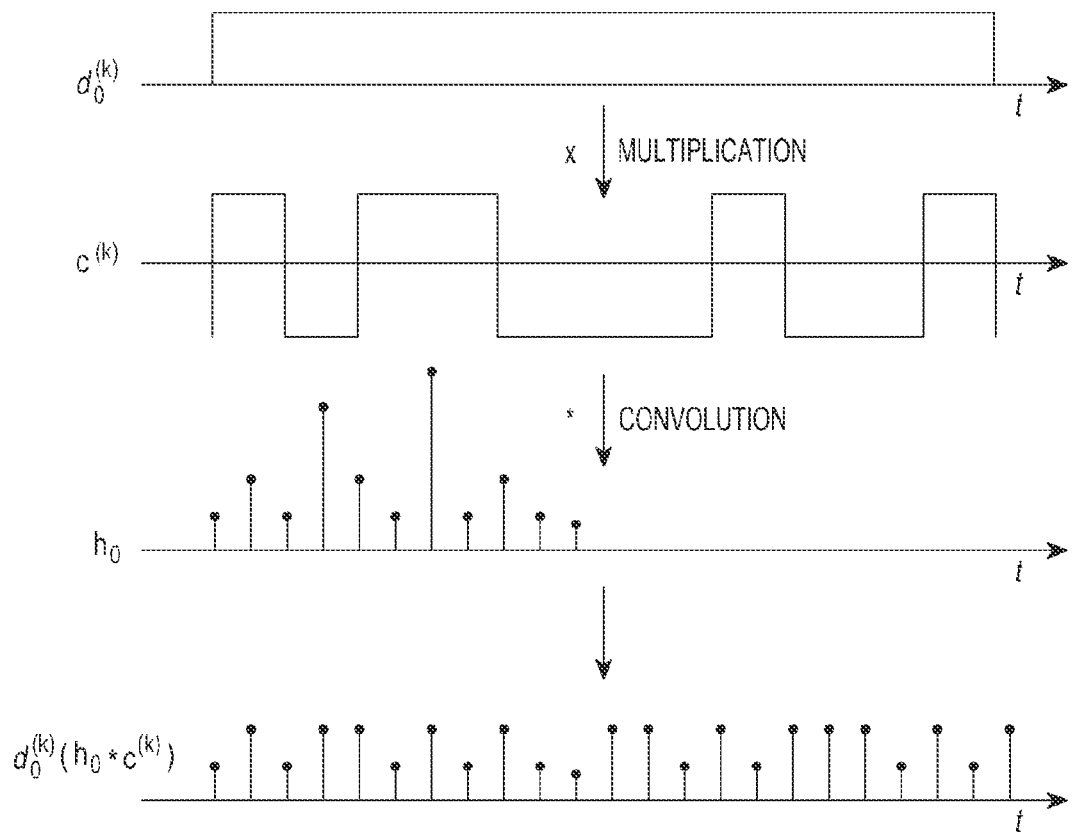
FIG. 1 is a diagram illustrating a received signal modeling in a case where one channelization code is used in a conventional communication system supporting a TD-SCDMA scheme.
Figure 2:
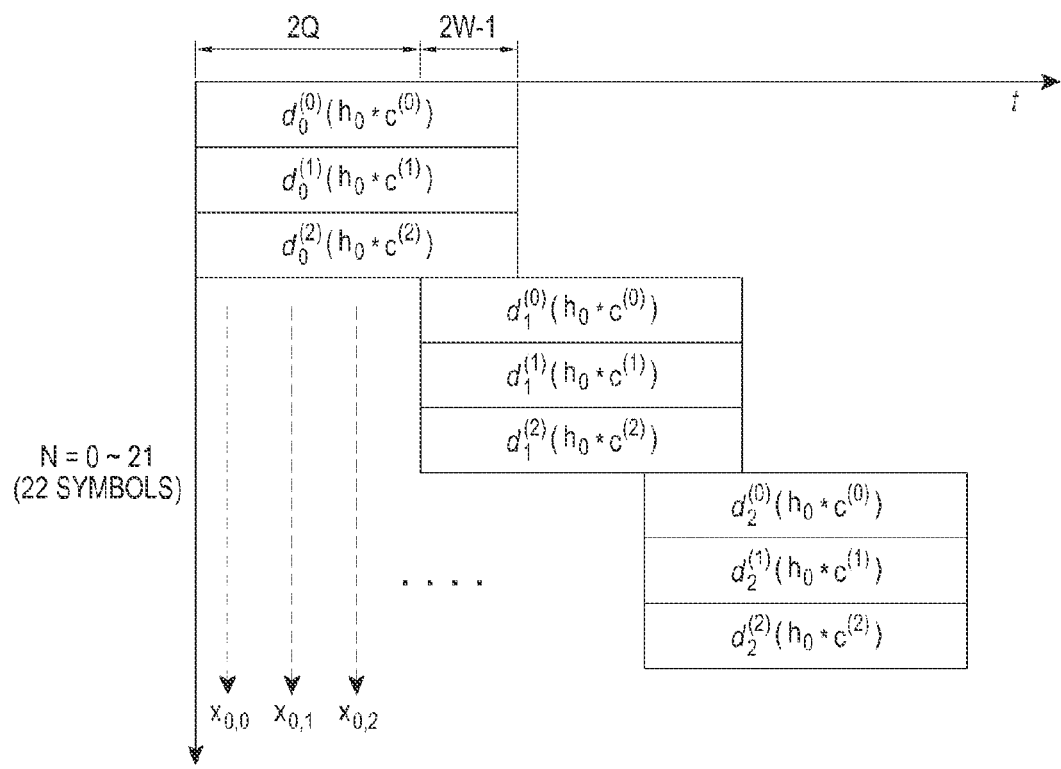
FIG. 2 is a diagram illustrating a transmitted signal modeling in a case where a plurality of channelization codes are used in a conventional communication system supporting a TD-SCDMA scheme.
Figure 3:
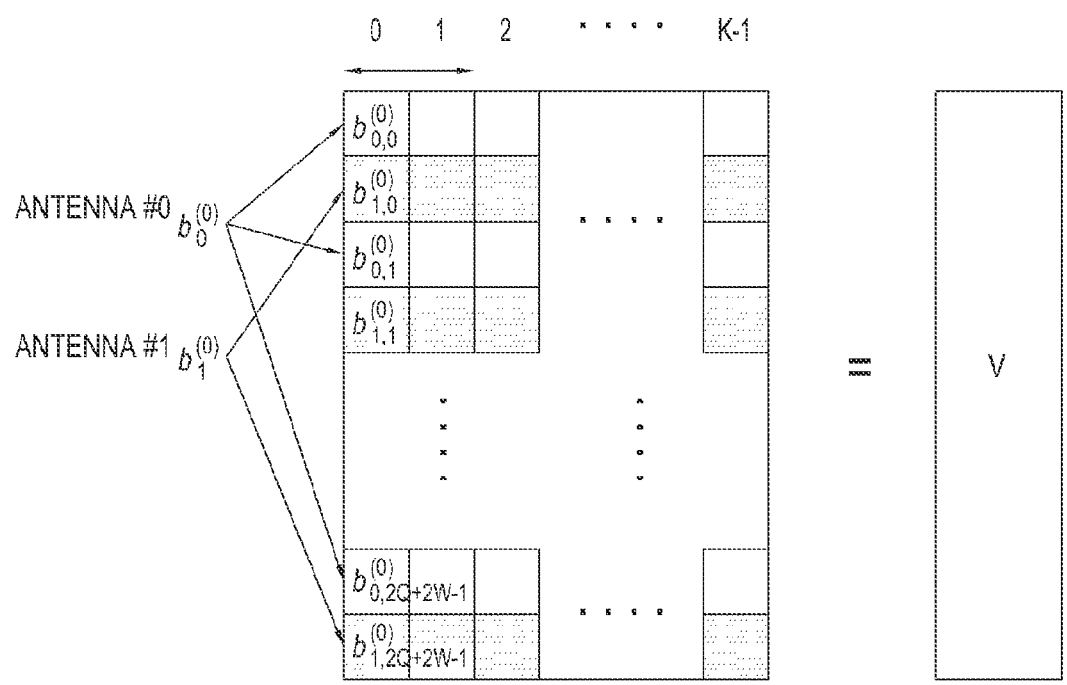
FIG. 3 is a diagram illustrating a structure of a matrix V in a conventional communication system supporting a TD-SCDMA scheme.
Figure 4:
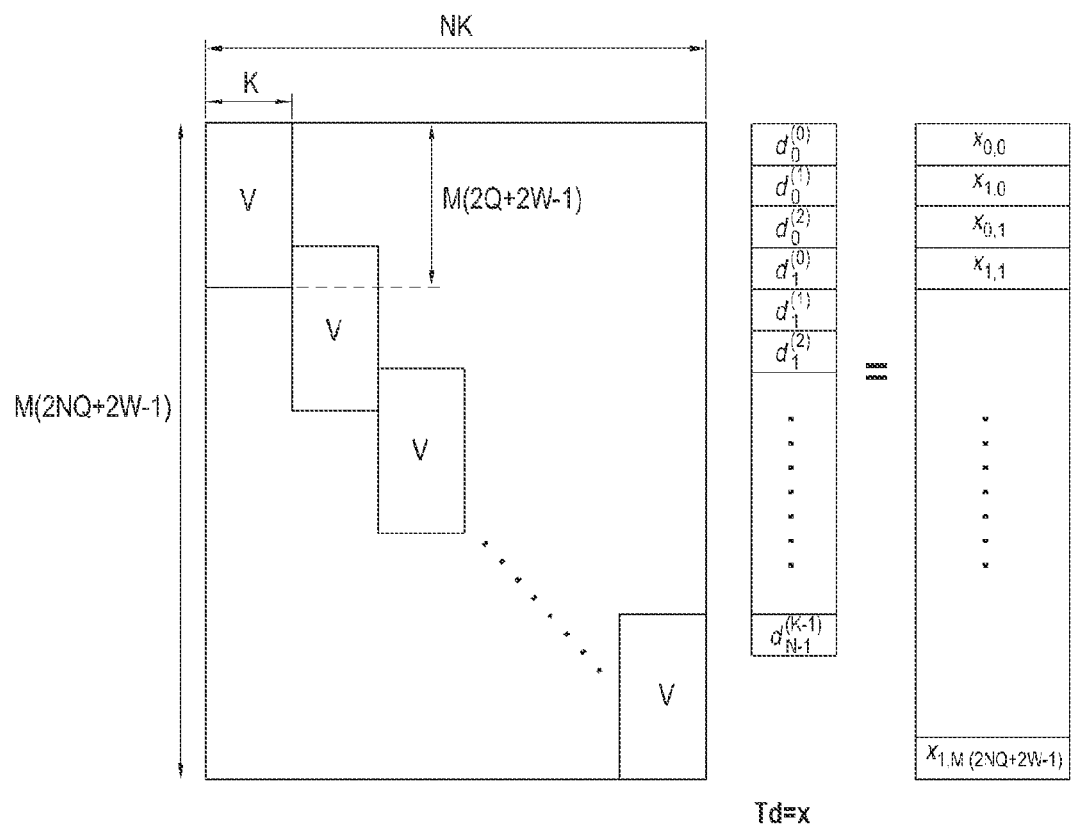
FIG. 4 is a diagram illustrating a structure of a matrix T in a conventional communication system supporting a TD-SCDMA scheme.

Hereinafter, embodiments of the present disclosure are described in detail with reference to the accompanying drawings. Those of ordinary skill in the art will recognize that various changes and modifications of the embodiments described herein can be made without departing from the scope and spirit of the present disclosure. In addition, descriptions of well-known functions and constructions may be omitted for clarity and conciseness. The same reference symbols are used throughout the drawings to refer to the same or like parts.

It should be noted that various embodiments described below may be applied or used individually or in combination.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

In accordance with the present disclosure, the terms "include" and "comprise," as well as derivatives thereof, mean inclusion without limitation; the term "or," is inclusive, meaning and/or, the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this disclosure, and those of ordinary skill in the art will appreciate that in many, if not most instances, such definitions apply to prior, as well as future uses of such defined words and phrases.

The terms used herein, including technical and scientific terms, have the same meanings as terms that are generally understood by those skilled in the art, as long as the terms are not defined differently. It should be understood that terms defined in a generally-used dictionary have meanings coinciding with those of terms in the related technology.

According to various embodiments of the present disclosure, an electronic device described herein may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

The electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync®, Apple TV®, or Google TV®), a gaming console, an electronic dictionary, an electronic key, a camcorder, an electronic picture frame, and/or the like.

The electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

The electronic device may be furniture, part of a building/structure, an electronic board, electronic signature receiving device, a projector, various measuring devices (e.g., water, electricity, gas or electro-magnetic wave measuring devices), and/or the like that include communication functionality.

The electronic device may be any combination of the foregoing devices. In addition, it will be apparent to one having ordinary skill in the art that the electronic device described herein is not limited to the foregoing devices.

For example, a signal receiving apparatus may be an electronic device. For example, a signal transmitting apparatus may be a base station (BS), and a signal receiving apparatus may be a mobile station (MS), a terminal, etc.

In accordance with an aspect of the present disclosure, there is provided a method for detecting a signal by a signal receiving apparatus in a communication system supporting a TDD-CDMA scheme. The method includes detecting a part of block diagonal matrices included in a diagonal matrix based on at least one CIR for a received signal, detecting remaining block diagonal matrices excluding the part of block diagonal matrices from among block diagonal matrices included in the diagonal matrix, estimating modulation symbols from the received signal based on the diagonal matrix, generating a block diagonal matrix by multiplying one of second matrices included in a first matrix, which is generated by applying a circular extension scheme to a fourth matrix including third matrices, by an FFT matrix, generating a third matrix for one of the estimated modulation symbols, the third matrix includes vectors for channelization codes, which are used in the communication system supporting the TDD-CDMA scheme, and generating a vector based on the channelization codes or the at least one CIR.

In accordance with an aspect of the present disclosure, there is provided a method for detecting a signal by a signal receiving apparatus in a communication system supporting a TDD-CDMA scheme. The method includes detecting matrix multiplications, which are generated by multiplying a part of block diagonal matrices included in a diagonal matrix using Hermitian multiplication of the part of block diagonal matrices, based on at least one channel impulse response (CIR) for a received signal, detecting matrix multiplications, which are generated by multiplying remaining block diagonal matrices excluding the part of block diagonal matrices from among block diagonal matrices included in the diagonal matrix using Hermitian multiplication of the remaining block diagonal matrices, estimating modulation symbols from the received signal based on the matrix multiplications, generating a block diagonal matrix by multiplying one of second matrices included in a first matrix, which is generated by applying a circular extension scheme to a fourth matrix including third matrices, by a fast Fourier transform (FFT) matrix, generating a third matrix for one of the modulation symbols, the third matrix includes vectors for channelization codes, which are used in the communication system supporting the TDD-CDMA scheme, and generating a vector based on the channelization codes or the at least one CIR.

In accordance with an aspect of the present disclosure, there is provided a method for detecting a signal by a signal receiving apparatus in a communication system supporting a TDD-CDMA scheme. The method includes detecting decomposition matrices for matrix multiplications, which are generated by multiplying a part of block diagonal matrices included in a diagonal matrix using Hermitian multiplication of the part of block diagonal matrices, based on at least one CIR for a received signal, detecting decomposition matrices for matrix multiplications, which are generated by multiplying remaining block diagonal matrices excluding the part of block diagonal matrices from among block diagonal matrices of the diagonal matrix using Hermitian multiplication of the remaining block diagonal matrices, estimating modulation symbols from the received signal based on the decomposition matrices, generating a block diagonal matrix by multiplying one of second matrices included in a first matrix, which is generated by applying a circular extension scheme to a fourth matrix including third matrices, by a FFT matrix, generating a third matrix for one of the modulation symbols, the third matrix includes vectors for channelization codes, which are used in the communication system supporting the TDD-CDMA scheme, and generating a vector based on the channelization codes or the at least one CIR.

In accordance with an aspect of the present disclosure, there is provided a signal receiving apparatus in a communication system supporting a TDD-CDMA scheme. The signal receiving apparatus includes a joint detector configured to detect a part of block diagonal matrices included in a diagonal matrix based on at least one CIR for a received signal, detect remaining block diagonal matrices excluding the part of block diagonal matrices from among block diagonal matrices of the diagonal matrix, estimate modulation symbols from the received signal based on the diagonal matrix, generate a block diagonal matrix by multiplying one of second matrices included in a first matrix, which is generated by applying a circular extension scheme to a fourth matrix including third matrices, by an FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

In accordance with an aspect of the present disclosure, there is provided a signal receiving apparatus in a communication system supporting a TDD-CDMA scheme. The signal receiving apparatus includes a joint detector configured to detect a part of block diagonal matrices included in a diagonal matrix based on at least one CIR for a received signal, detect remaining block diagonal matrices excluding the part of block diagonal matrices from among block diagonal matrices of the diagonal matrix, estimate modulation symbols from the received signal based on the diagonal matrix, generate a block diagonal matrix by multiplying one of second matrices included in a first matrix, which is generated by applying a circular extension scheme to a fourth matrix including third matrices, by a FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

In accordance with an aspect of the present disclosure, there is provided a signal receiving apparatus in a communication system supporting a TDD-CDMA scheme. The signal receiving apparatus includes a joint detector configured to detect decomposition matrices for matrix multiplications, which are generated by multiplying a part of block diagonal matrices included in a diagonal matrix using Hermitian multiplication of the part of block diagonal matrices, based on at least one CIR for a received signal, detect decomposition matrices for matrix multiplications, which are generated by multiplying remaining block diagonal matrices excluding the part of block diagonal matrices from among block diagonal matrices of the diagonal matrix using Hermitian multiplication of the remaining block diagonal matrices, and estimate modulation symbols from the received signal based on the decomposition matrices, generate a block diagonal matrix by multiplying one of second matrices included in a first matrix, which is generated by applying a circular extension scheme to a fourth matrix including third matrices, by a FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

In accordance with an aspect of the present disclosure, there is provided a system on chip (SoC) for use with a signal receiving apparatus in a communication system supporting a TDD-CDMA scheme. The SoC includes a joint detector module configured to detect a part of block diagonal matrices included in a diagonal matrix based on at least one CIR for a received signal, detect remaining block diagonal matrices excluding the part of block diagonal matrices from among block diagonal matrices of the diagonal matrix, estimate modulation symbols from the received signal based on the diagonal matrix, generate a block diagonal matrix by multiplying one of second matrices included in a first matrix, which is generated by applying a circular extension scheme to a fourth matrix including third matrices, by a FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

In accordance with an aspect of the present disclosure, there is provided a SoC for use with a signal receiving apparatus in a communication system supporting a TDD-CDMA scheme. The SoC includes a joint detector configured to detect matrix multiplications, which are generated by multiplying a part of block diagonal matrices included in a diagonal matrix using Hermitian multiplication of the part of block diagonal matrices, based on at least one CIR for a received signal, detect matrix multiplications, which are generated by multiplying remaining block diagonal matrices excluding the part of block diagonal matrices from among block diagonal matrices of the diagonal matrix using Hermitian multiplication of the remaining block diagonal matrices, estimate modulation symbols from the received signal based on the matrix multiplications, generate a block diagonal matrix by multiplying one of second matrices included in a first matrix, which is generated by applying a circular extension scheme to a fourth matrix including third matrices, by a FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

In accordance with an aspect of the present disclosure, there is provided a SoC for use with a signal receiving apparatus in a communication system supporting a TDD-CDMA scheme. The SoC includes a joint detector configured to detect decomposition matrices for matrix multiplications, which are generated by multiplying a part of block diagonal matrices included in a diagonal matrix using Hermitian multiplication of the part of block diagonal matrices, based on at least one CIR for a received signal, detect decomposition matrices for matrix multiplications, which are generated by multiplying remaining block diagonal matrices excluding the part of block diagonal matrices from among block diagonal matrices of the diagonal matrix using Hermitian multiplication of the remaining block diagonal matrices, and estimate modulation symbols from the received signal based on the decomposition matrices, generate a block diagonal matrix by multiplying one of second matrices included in a first matrix, which is generated by applying a circular extension scheme to a fourth matrix including third matrices, by a FFT matrix, generate a third matrix for one of the modulation symbols, the third matrix includes vectors for channelization codes, which are used in the communication system supporting the TDD-CDMA scheme, and generate a vector based on the channelization codes or the at least one CIR.

A method and apparatus described in accordance with the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) mobile communication system, a mobile internet protocol (Mobile IP) system, and/or the like.

For convenience, in an embodiment of the present disclosure, a communication system supports a TDD-CDMA scheme, however, it will be understood by those of ordinary skill in the art that various communication system may support a Frequency Division Duplex (FDD)-CDMA scheme.

A transmitted signal, i.e., a data symbol d is spread based on a channelization code c, and a convolution computation with a channel impulse response (CIR) h is performed on a data symbol d*c which is generated by spreading the data symbol d based on the channelization code c. Therefore, a system through which the data symbol d is passed is given as a convolution form between the channelization code c and the CIR h, i.e., a vector b. Here, it will be assumed that a vector b for the kth channelization code $c^{(k)}$ is $b^{(k)}$.

So, $b^{(k)}$ for a CIR $h_0$ may be expressed using Equation (10):

$$b_0^{(k)}=h_0*c^{(k)}=[b_{0,0}^{(k)},b_{0,1}^{(k)},\ldots,b_{0,2Q+2W-1}^{(k)}] \quad (10)$$

In Equation (10), $b_0^{(k)}$ denotes $b^{(k)}$ for the CIR $h_0$, Q denotes a spreading factor, W denotes a tap length of a related CIR, and $c^{(k)}$ denotes the kth channelization code among K channelization codes if the communication system supporting the TD-SCDMA scheme supports the K channelization codes. The CIR $h_0$ denotes a CIR for an antenna #0 if a signal receiving apparatus uses a plurality of antennas, e.g., two antennas, i.e., the antenna #0 and an antenna #1.

Further, $b^{(k)}$ for a CIR $h_1$ may be expressed using Equation (11):

$$b_1^{(k)}=h_1*c^{(k)}=[b_{1,0}^{(k)},b_{1,1}^{(k)},\ldots,b_{1,2Q+2W-1}^{(k)}] \quad (11)$$

In Equation (11), $b_1^{(k)}$ denotes $b^{(k)}$ for the CIR $h_1$, and the CIR $h_1$ denotes a CIR for the antenna #1.

If the vector $b^{(k)}$ is regarded as one column, vectors b for the K channelization codes may be included in one matrix, and it will be assumed that this matrix is a matrix V. In the matrix V, a vector b for an arbitrary channelization code c is generated as one column, so the matrix V includes K columns.

The matrix V is defined for one QAM symbol from among N modulation symbols, e.g., N QAM symbols. In order to generate a system matrix for overall locations of the N QAM symbols, i.e., all QAM symbols included in one data block, N matrices V are concatenated by cascading matrices V for the N QAM symbols.

It will be assumed that the system matrix, which is generated by cascading matrices V for the N QAM symbols, is a matrix T. That is, the matrix T is a matrix including the matrices V which are generated for the N QAM symbols.

A size of the matrix T is quite large, that is, the size of the matrix T has a size equal to or greater than a threshold size, and an operation of detecting a pseudo-inverse matrix of $(T^HT+\sigma^2I)$ requires a significant amount of processing computation, i.e., a processing computation amount equal to or greater than a threshold processing computation amount. Here, $\sigma$ denotes a covariance of a Gaussian noise n, H denotes a Hermitian, and I denotes an identity matrix.

If 16 channelization codes are used and one data block includes 22 QAM symbols in the communication system, the number of columns included in the matrix T is 352 (i.e., 16×22). If a processing computation amount of an inverse matrix is proportional to a cube of a matrix size, a processing computation amount necessary for processing one data block is equal to or greater than tens of mega flops.

As noted above, processing such a computation amount, using conventional hardware and/or a conventional digital signal processing (DSP) core, can significantly increase power consumption of conventional signal receiving apparatuses.

In order to decrease the processing complexity and the processing computation amount, a circular matrix extension scheme is described herein.

The matrix T has block Toeplitz matrix characteristics. An equation solution may be regarded as an equation solution which is acquired in a block circular matrix, which is generated by expanding the block Toeplitz matrix. The more revealed this characteristic is, the larger a size of the block Toeplitz matrix is. The size of the matrix T is greater than or equal to the threshold size, so it may be considered that the circular matrix extension scheme is applied to the matrix T.

The circular matrix extension scheme is applied to the matrix T and a circular matrix isdiagonalized using a fast Fourier transform (FFT) scheme. It is, therefore, possible to detect a pseudo-inverse matrix based on a scheme of computing an inverse number for elements, which are located at a diagonal line of a matrix, which is diagonalized, as opposed tousing an overall matrix. Since the scheme of detecting the pseudo inverse matrix based on the scheme of computing the inverse number for the elements uses a relatively small amount of processing computation, when compared to the scheme of detecting the pseudo inverse matrix for the overall matrix, the circular matrix extension scheme is applied to the matrix T.

Figure 5:
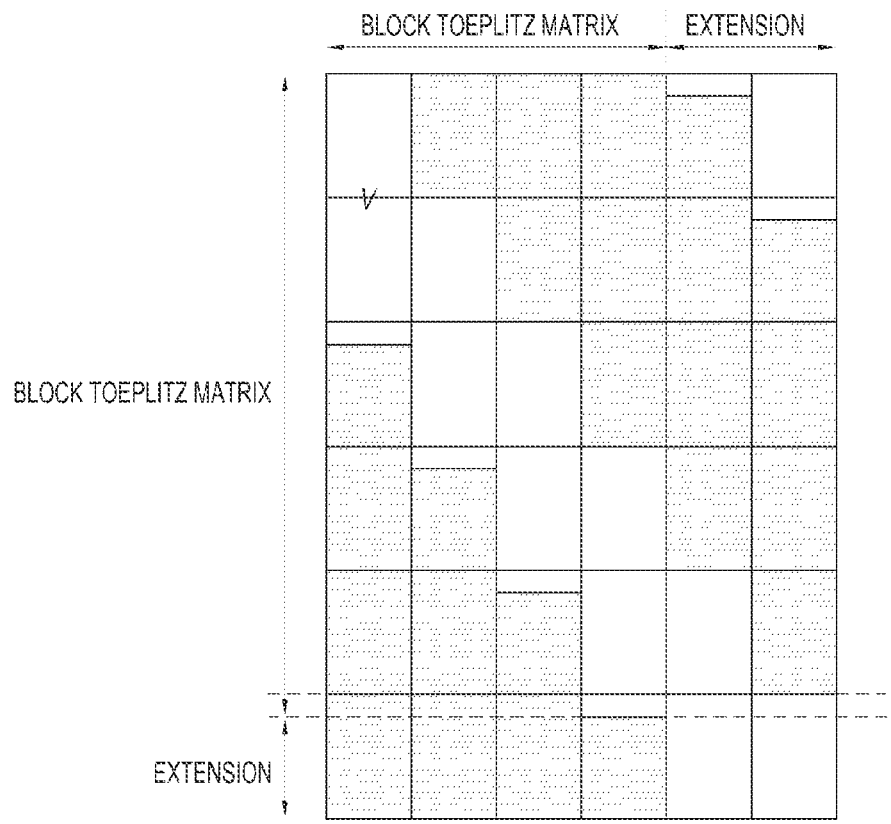
FIG. 5 is a diagram illustrating an example of a circular extension scheme which is used in a communication system supporting a TDD-CDMA scheme, according to an embodiment of the present disclosure.

FIG. 5 is a diagram illustrating an example of a circular extension scheme which is used in a communication system supporting a TDD-CDMA scheme, according to an embodiment of the present disclosure.

Referring to FIG. 5, it will be assumed that a matrix which is generated by applying a circular extension scheme to a matrix T is a matrix C. A system equation after the circular extension scheme is applied to the matrix T may be expressed using Equation (12):

$$c \begin{bmatrix} d \\ d_{ex} \end{bmatrix} + n = \begin{bmatrix} y \\ y_{ex} \end{bmatrix} \quad (12)$$

In Equation (12), $d_{ex}$ denotes a data symbol, which is mapped to a part of the circular matrix which is generated according that the circular extension scheme, that is applied to the matrix T, and $y_{ex}$ denotes a received signal vector, in which a Gaussian noise in included, which corresponds to the data symbol $d_{ex}$.

Equation (12) may be expressed using Equation (13):

$$Cd_c + n = y_c \quad (13)$$

The $d_c$ and the $y_c$ in Equation (13) may be expressed using Equation (14):

$$d_c = \begin{bmatrix} d \\ d_{ex} \end{bmatrix}, y_c = \begin{bmatrix} y \\ y_{ex} \end{bmatrix} \quad (14)$$

If the matrix C is multiplied by a matrix F as an FFT matrix, the matrix C may be relatively easy to be block diagonalized. One characteristic of a circular matrix is that diagonal element values may be acquired when a diagonlization process is performed after an FFT operation is performed on the first column from among columns included in the circular matrix.

Since the matrix C is a block matrix, a matrix which is generated by multiplying the matrix C by the matrix F becomes a block matrix, so diagonlization process is performed as a block diagonlization process form. Even though the block diagonlization process is performed, a processing computation amount thereof is relatively small when compared to a process of detecting an inverse matrix for an overall matrix.

Figure 6:
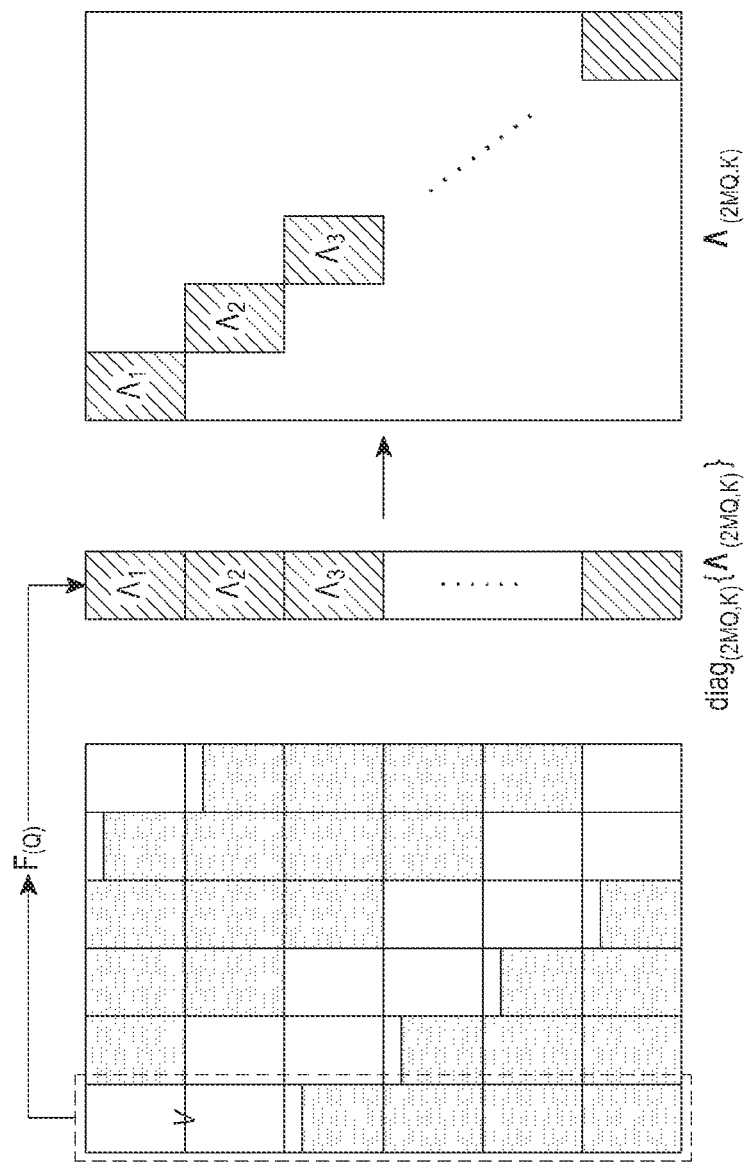
FIG. 6 is a diagram illustrating a block diagonalization process for a matrix C in a communication system supporting a TDD-CDMA scheme, according to an embodiment of the present disclosure.

FIG. 6 is a diagram illustrating a block diagonalization process for a matrix C in a communication system supporting a TDD-CDMA scheme, according to an embodiment of the present disclosure.

Referring to FIG. 6, matrices V included in the matrix C have extended forms when compared to matrices V included in the matrix T, accordingly, the matrix C is generated by applying a circular extension scheme to the matrix T.

It will be assumed that each block diagonal matrices, which are generated by multiplying matrices V included in the matrix C by a matrix F, is a matrix $\Lambda$. As illustrated in FIG. 6, the matrix C includes N matrices V. If the matrix C is multiplied by the matrix F, N matrices $\Lambda$, i.e., a matrix $\Lambda_1$, a matrix $\Lambda_2$, a matrix $\Lambda_3$, . . . , a matrix $\Lambda_N$, are generated. Each of the matrix $\Lambda_1$, the matrix $\Lambda_2$, the matrix $\Lambda_3$, . . . , the matrix $\Lambda_N$ is a block diagonal matrix, and a matrix including the block diagonal matrices, i.e., the matrix $\Lambda_1$, the matrix $\Lambda_2$, the matrix $\Lambda_3$, . . . , the matrix $\Lambda_N$, will be called a 'diagonal matrix'.

A size of the matrix $\Lambda$ is 2MQ×K, so Equation (13) may be expressed using Equation (15):

$$F_{2MQ}^{-1} \Lambda_{2MQ,K} F_K d_c + n = y_c \quad (15)$$

Equation (15) may be expressed using Equation (16). That is, if a matrix $F_{2MQ}^{-1}$ is multiplied by an inverse matrix, i.e., a matrix $F_{2MQ}$ in Equation (15), Equation (15) may be expressed using Equation (16):

$$\Lambda_{2MQ,K} F_K d_c + F_{2MQ} n = F_{2MQ} y_c = Y_c \quad (16)$$

Figure 7:
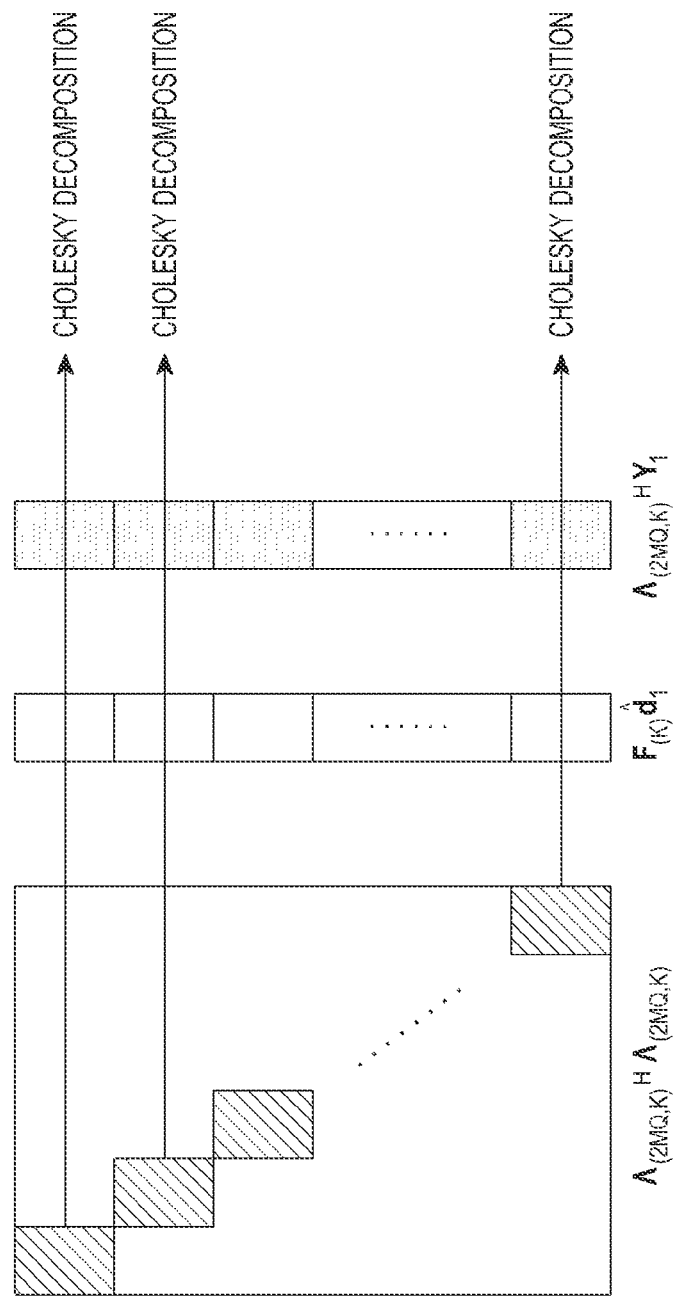
FIG. 7 is a diagram illustrating a method of detecting a solution for a matrix Λ in a communication system supporting a TDD-CDMA scheme, according to an embodiment of the present disclosure.

FIG. 7 is a diagram illustrating a method of detecting a solution for a matrix $\Lambda$ in a communication system supporting a TDD-CDMA scheme, according to an embodiment of the present disclosure.

Referring to FIG. 7, a method for detecting a solution for the matrix $\Lambda$ includes performing a pseudo inverse operation on the matrix $\Lambda$.

As described in FIG. 6, if a matrix C is multiplied by a matrix F, N matrices $\Lambda$, i.e., $\Lambda_1$, $\Lambda_2$, $\Lambda_3$, . . . , $\Lambda_N$ are generated. In order to detect a solution for each of the matrices $\Lambda_1$, $\Lambda_2$, $\Lambda_3$, . . . , $\Lambda_N$, a Hermitian multiplication is performed N times and N direct inverse matrix computations or N Cholesky decomposition computations, and N substitution computations are required. In an embodiment of the present disclosure, a Cholesky decomposition scheme is used, however, it will be understood by those of ordinary skill in the art that various other decomposition schemes may be used.

A process including the N Hermitian multiplication computations, the N inverse matrix computations or the N Cholesky decomposition computations, and the N substitution computations accounts for most of the processing computation, which is necessary in a case that a joint detection (JD) scheme is performed.

If a signal detector, which is based on the JD scheme, is implemented, most of the hardware complexity is required in order to implement a process including the N Hermitian multiplication computations, the N inverse matrix computations or the N Cholesky decomposition computations, and the N substitution computations.

Figure 8:
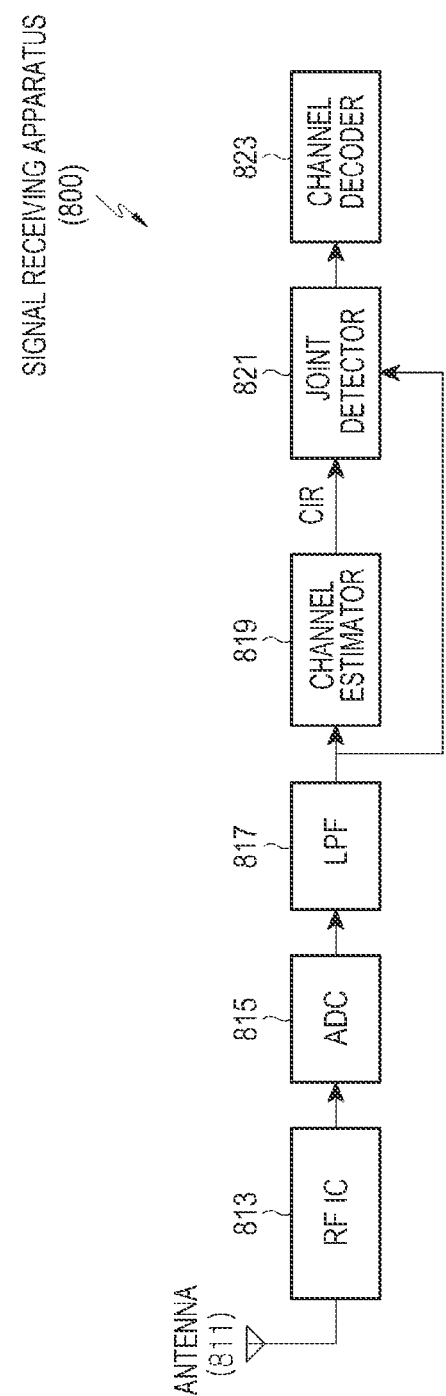
FIG. 8 is a diagram illustrating an inner structure of a signal receiving apparatus in a communication system supporting a TDD-CDMA scheme, according to an embodiment of the present disclosure.

FIG. 8 is a diagram illustrating an inner structure of a signal receiving apparatus in a communication system supporting a TDD-CDMA scheme, according to an embodiment of the present disclosure.

Referring to FIG. 8, the signal receiving apparatus 800, which can be embodied in a BS, a user terminal, or other device described above, includes an antenna 811, an RF IC 813, an analog to digital converter (ADC) 815, a low pass filter (LPF) 817, a channel estimator 819, a joint detector 821, and a channel decoder 823.

A signal received through the antenna 811 is input to the RF IC 813, the RF IC 813 performs a RF processing operation on the signal received through the antenna 811, and outputs the RF processed signal to the ADC 815. The ADC 815 converts the signal output from the RF IC 813 to a digital signal, and outputs the digital signal to the LPF 817.

The LPF 817 performs a low pass filtering operation on the digital signal output from the ADC 815 to generate a base band signal, and outputs the generated base band signal to the channel estimator 819. For example, the LPF 817 may be implemented with a squared root raised cosine (SRRC) filter. The LPF 817 outputs the base band signal to the joint detector 821.

The channel estimator 819 estimates a CIR based on the base band signal output from the LPF 817, and outputs the estimated CIR to the joint detector 821. The joint detector 821 estimates modulation symbols, e.g., QAM symbols, which a signal transmitting apparatus transmits, based on the base band signal output from the LPF 817 and the CIR output from the channel estimator 819, and outputs the estimated QAM symbols to the channel decoder 823. The channel decoder 823 may detect an original data symbol, which the signal transmitting apparatus transmits, based on the QAM symbols output from the joint detector 821.

While the antenna 811, the RF IC 813, the ADC 815, the LPF 817, the channel estimator 819, the joint detector 821, and the channel decoder 823 are described as separate units, it is to be understood that this is merely for convenience of description. In other words, two or more of the antenna 811, the RF IC 813, the ADC 815, the LPF 817, the channel estimator 819, the joint detector 821, and the channel decoder 823 may be incorporated into a single unit, e.g., incorporated into a system on chip (SoC).

Figure 9:
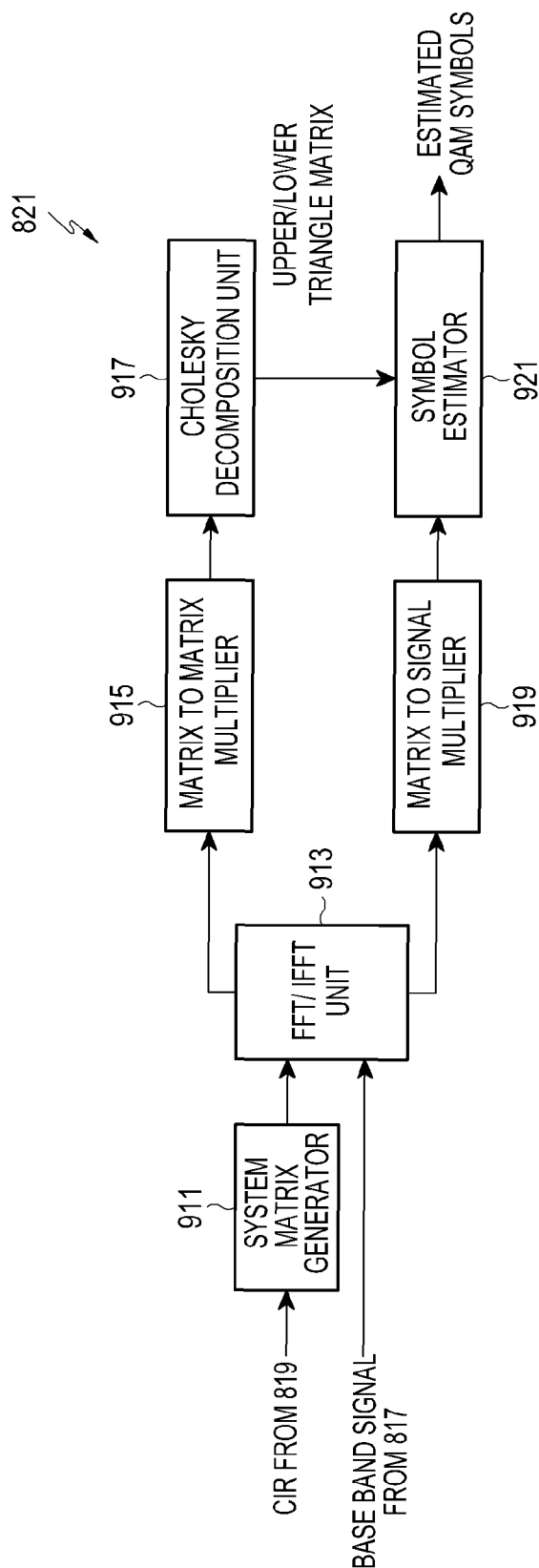
FIG. 9 is a diagram illustrating an inner structure of a joint detector shown in FIG. 8.

FIG. 9 is a diagram illustrating an inner structure of a joint detector 821 shown in FIG. 8.

Referring to FIG. 9, the joint detector 821 includes a system matrix generator 911, an FFT/inverse fast Fourier transform (IFFT) unit 913, a matrix to matrix multiplier 915, a Cholesky decomposition unit 917, a matrix to signal multiplier 919, and a symbol estimator 921.

A CIR output from the channel estimator 819 of FIG. 8 is input to the system matrix generator 911. The system matrix generator 911 generates a system matrix based on the CIR, and outputs the generated system matrix to the FFT/IFFT unit 913.

A base band signal output from an LPF 817 of FIG. 8 is input to the FFT/IFFT unit 913. The FFT/IFFT unit 913 performs an FFT operation on the system matrix output from the system matrix generator 911 and the base band signal output from the LPF 817 to generate a frequency domain signal, and outputs the frequency domain signal to the matrix to matrix multiplier 915 and the matrix to signal multiplier 919.

The matrix to matrix multiplier 915 detects block diagonal matrices based on the frequency domain signal output from the FFF/IFFT unit 913, generates matrix multiplications by performing a multiplication operation from among the block diagonal matrices, and outputs the generated matrix multiplications to the Cholesky decomposition unit 917. The matrix to signal multiplier 919 performs a multiplication operation between the frequency domain signal output from the FFF/IFFT unit 913 and a diagonalized matrix to generate a signal, and outputs the generated signal to the symbol estimator 921.

The Cholesky decomposition unit 917 applies a Cholesky decomposition scheme to the matrix multiplications output from the matrix to matrix multiplier 915 to generate an upper triangle matrix and a lower triangle matrix, and outputs the generated upper triangle matrix and the generated lower triangle matrix to the symbol estimator 921.

The symbol estimator 921 estimates QAM symbols based on the upper triangle matrix and the lower triangle matrix output from the Cholesky decomposition unit 917 and the signal output from the matrix to signal multiplier 919. For example, the symbol estimator 921 may be implemented based on a forward/backward substitution scheme.

While the system matrix generator 911, the FFT/IFFT unit 913, the matrix to matrix multiplier 915, the Cholesky decomposition unit 917, the matrix to signal multiplier 919, and the symbol estimator 921 are described as separate units, it is to be understood that this is merely for convenience of description. In other words, two or more of the system matrix generator 911, the FFT/IFFT unit 913, the matrix to matrix multiplier 915, the Cholesky decomposition unit 917, the matrix to signal multiplier 919, and the symbol estimator 921 may be incorporated into a single unit, e.g., incorporated into an SoC.

As described above, as processing complexity, processing computation amount, and implementation complexity of a JD scheme, which is based on the circular matrix extension scheme, increases, hardware size and a processing computation amount of a DSP core also increases.

If processing among time slots is performed with the JD scheme, which is based on the circular matrix extension scheme, for enhancing performance of a signal receiving apparatus in relatively high Doppler frequency environment, the processing complexity, the processing computation amount, and the implementation complexity of the JD scheme, which is based on the circular matrix extension scheme, increases.

A signal detection scheme, which is based on a JD scheme, for decreasing processing complexity, processing computation amount, and implementation complexity of a JD scheme, which is based on the circular matrix extension scheme, will be described below.

As described above, most of the processing computation amount which occurs in the JD scheme, which is based on the circular matrix extension scheme, occurs while performing a matrix multiplication operation between a matrix $\Lambda$ and a Hermitian of the matrix $\Lambda$, and a Cholesky decomposition operation for a matrix which is generated by multiplying the matrix $\Lambda$ by the Hermitian of the matrix $\Lambda$.

As noted above, it may prove advantageous for decreasing processing complexity, processing computation amount, and implementation complexity of a signal receiving apparatus. Accordingly, a scheme of significantly decreasing complexity without performance degradation or with limited performance degradation is described herein. Such a scheme may be used for implementing a low-power, low-price CDMA signal receiving apparatus.

Further, a conventional JD scheme considers only a signal detecting operation in one time slot based on a slot by slot scheme, In accordance with the present disclosure, a scheme of detecting a signal thereby enhancing performance by considering a high Doppler frequency environment and decreasing processing complexity, processing computation amount, and implementation complexity is provided.

More particularly, computations of which complexity is high are performed in a frequency domain after an FFT operation is performed.

A matrix T which is a target for the FFT operation includes a convolution between a channelization code and a CIR. Coherence bandwidth of a frequency domain signal, which is generated according to the FFT operation, is quite wide since most of the signal energy is located within a limited tap of a front part of the CIR, according to a characteristic of the CIR. That is, the coherence bandwidth of the frequency domain signal, which is generated according to the FFT operation, is equal to or greater than threshold coherence bandwidth. In other words, matrices, which are adjacent one another, among a matrix $\Lambda_1$ to a matrix $\Lambda_N$ in FIG. 6, after the FFT operation, have quite similar element values. That is, there is a possibility for a joint detector to detect a related matrix $\Lambda$ by applying an estimation algorithm on the related matrix $\Lambda$ and neighbor matrices $\Lambda$s even though the joint detector does not perform a computing operation on all of the matrix $\Lambda_1$ to the matrix $\Lambda_N$.

A scheme of detecting a signal which is based on a JD scheme, thereby detecting all of the matrix $\Lambda_1$ to the matrix $\Lambda_N$, without performing a computing operation on all of the matrix $\Lambda_1$ to the matrix $\Lambda_N$, that is, by performing the computing operation on a part of the matrix $\Lambda_1$ to the matrix $\Lambda_N$, will be described below.

Figure 10:
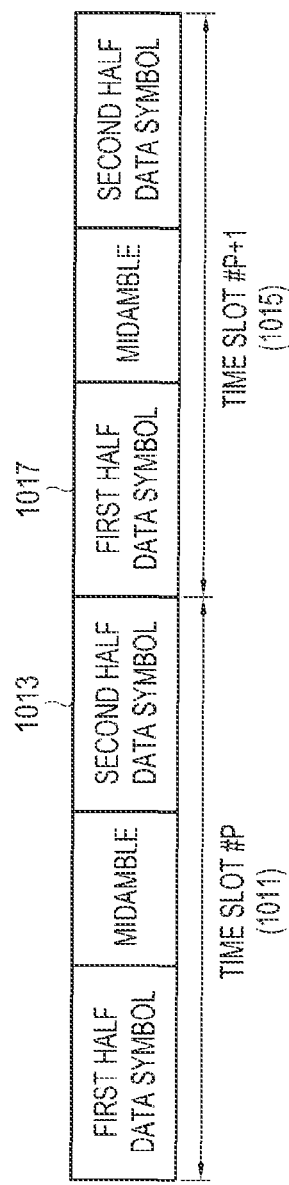
FIG. 10 is a diagram illustrating a structure of a time slot in a communication system supporting a TDD-CDMA scheme, according to an embodiment of the present disclosure.

FIG. 10 is a diagram illustrating a structure of a time slot in a communication system supporting a TDD-CDMA scheme, according to an embodiment of the present disclosure.

Referring to FIG. 10, one time slot includes two half data symbols, i.e., the first half data symbol, the second half data symbol, and a midamble.

If a conventional joint detector performs a signal detecting operation on each of the second half data symbol 1013 of a time slot #P 1011 and the first half data symbol 1017 of a time slot #P+1 1015 based on only a channel estimation result of a related time slot, it may be difficult for the conventional joint detector to acquire best signal detection performance in a high Doppler frequency environment.

The joint detector 821 enhances signal detection performance by performing a signal detecting operation using a channel estimation result of the time slot #P 1011 and a channel estimation result of the time slot #P+1 1015. So, a system matrix, which is used in each of the second half data symbol 1013 of the time slot #P 1011 and the first half data symbol 1017 of the time slot #P+1 1015, is also changed.

A signal detecting operation for a related time slot is performed by considering only the next time slot, however, it will be understood by those of ordinary skill in the art that the number of time slots which are considered in a case where the signal detecting operation for the related time slot is performed is not limited.

JD schemes, i.e., the first JD scheme, the second JD scheme, and the third JD scheme, will be described below.

The first JD scheme will be described with reference to FIGS. 11 and 12.

The first JD scheme is a JD scheme which is based on an interpolation scheme for a diagonal matrix including block diagonal matrices, i.e., a matrix $\Lambda_1$, a matrix $\Lambda_2$, a matrix $\Lambda_3$, ..., a matrix $\Lambda_N$. That is, a joint detector in the first JD scheme does not perform a computing operation for detecting block diagonal matrices included in the diagonal matrix. However, the joint detector in the first JD scheme performs a computing operation of detecting a part of the block diagonal matrices included in the diagonal matrix, and applies an interpolation scheme to the detected block diagonal matrices to detect remaining block diagonal matrices.

In the first JD scheme, the joint detector detects block diagonal matrices by considering a time slot, e.g., a time slot # P+1, next to a related time slot, e.g., a time slot #P, as well as the time slot #P.

It will be assumed that block diagonal matrices included in a diagonal matrix for the time slot #P are a matrix $\Lambda_{P,1}$ to a matrix $\Lambda_{P,N}$, and block diagonal matrices included in a diagonal matrix for the time slot #P+1 are a matrix $\Lambda_{P+1,1}$ to a matrix $\Lambda_{P+1,N}$.

N block diagonal matrices are generated for one data block, so 2N block diagonal matrices are generated for the time slot #P and the time slot #P+1.

However, neighbor block diagonal matrices from among block diagonal matrices, which are generated by performing an FFT operation on a convolution between a CIR and a channelization code, have similar elements. If coherence bandwidth of a multipath channel is relatively wide, that is, the coherence bandwidth of the multipath channel is greater than threshold bandwidth, the neighbor block diagonal matrices have more similar elements.

In the first JD scheme, coherent characteristic in a time domain is considered according to a value of Doppler shift. For example, in a low-speed channel equal to or less than a threshold speed, values of elements included in a matrix $\Lambda_{P,N}$ are similar to values of elements included in a matrix $\Lambda_{P+1,N}$.

In the first JD scheme, the joint detector detects all block diagonal matrices for the time slot #P and the time slot #P+1 by computing a part of block diagonal matrices for the time slot #P and a part of block diagonal matrices for the time slot #P+1, instead of computing 2N block diagonal matrices for the time slot #P and the time slot #P+1.

That is, the joint detector detects each of the remaining block diagonal matrixes for the time slot #P, which are not computed, and remaining block diagonal matrixes for the time slot #P+1, which are not computed, based on the part of the block diagonal matrixes for the time slot #P, which is computed, and the part of the block diagonal matrixes for the time slot #P+1, which is computed. Here, it will be assumed that block diagonal matrices which the joint detector computes from among block diagonal matrices for a related time slot are block diagonal matrices of which indexes are odd-numbered indexes. However, it will be understood by those of ordinary skill in the art that the block diagonal matrices which the joint detector computes from among the block diagonal matrices for the related time slot may be block diagonal matrices of which indexes are even-numbered indexes. That is, block diagonal matrices which are computed from among block diagonal matrices for a related time slot may be adaptively changed as occasion demands.

The joint detector decreases processing computation amount by using a time-frequency 2D filter as in Equation (17) below, and a filter factor of the time-frequency 2D filter may use a Wiener filter, which implements a minimum mean squared error (MMSE) estimation operation. Here, an interpolator may be used instead of the Wiener filter. Processing computation amount in a case where the interpolator is used instead of the Wiener filter is less than processing computation amount in a case where the Wiener filter is used.

$$\Lambda_{P,n} = \left(\sum_{i=1}^{N} a_{P,i} \Lambda_{P,i}\right) + \left(\sum_{i=1}^{N} a_{P+1,i} \Lambda_{P+1,i}\right) \quad (17)$$

In Equation (17), $a_{P,i}$ and $a_{P+1,i}$ denote filter factors of the Wiener filter.

Figure 11:
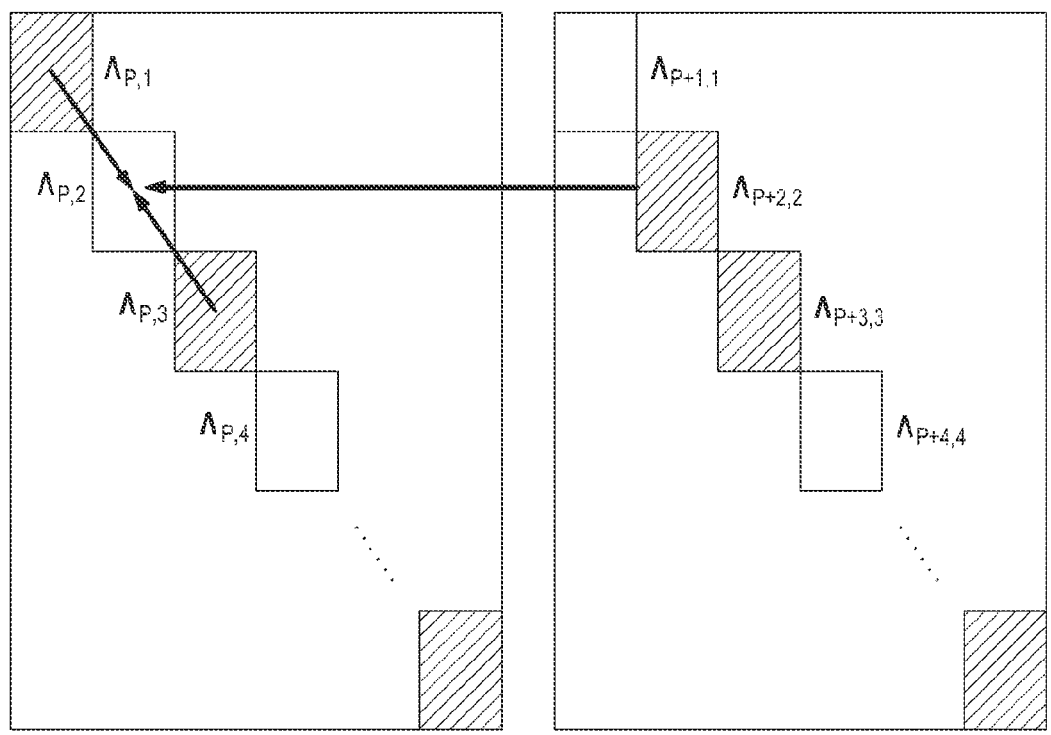
FIG. 11 is a diagram illustrating an interpolation process for block diagonal matrices which is performed in the first JD scheme in a communication system supporting a TDD-CDMA scheme, according to an embodiment of the present disclosure.

FIG. 11 is a diagram illustrating an interpolation method for block diagonal matrices which is performed in the first JD scheme in a communication system supporting a TDD-CDMA scheme, according to an embodiment of the present disclosure.

Referring to FIG. 11, the joint detector performs a computing operation on only odd-numbered block diagonal matrices from among block diagonal matrices included in a time slot #P, i.e., a matrix $\Lambda_{P,1}$, a matrix $\Lambda_{P,3}$, ..., and generates other block diagonal matrices except for the matrix $\Lambda_{P,1}$, a matrix $\Lambda_{P,3}$, ..., by interpolating the computed matrix $\Lambda_{P,1}$, matrix $\Lambda_{P,3}$, . . . . In this way, the joint detector generates a diagonal matrix by performing an interpolation process for the block diagonal matrices.

As described in FIG. 11, if the first JD scheme is used, the joint detector decreases the number of FFT computations necessary for block diagonal matrix generation.

Figure 12:
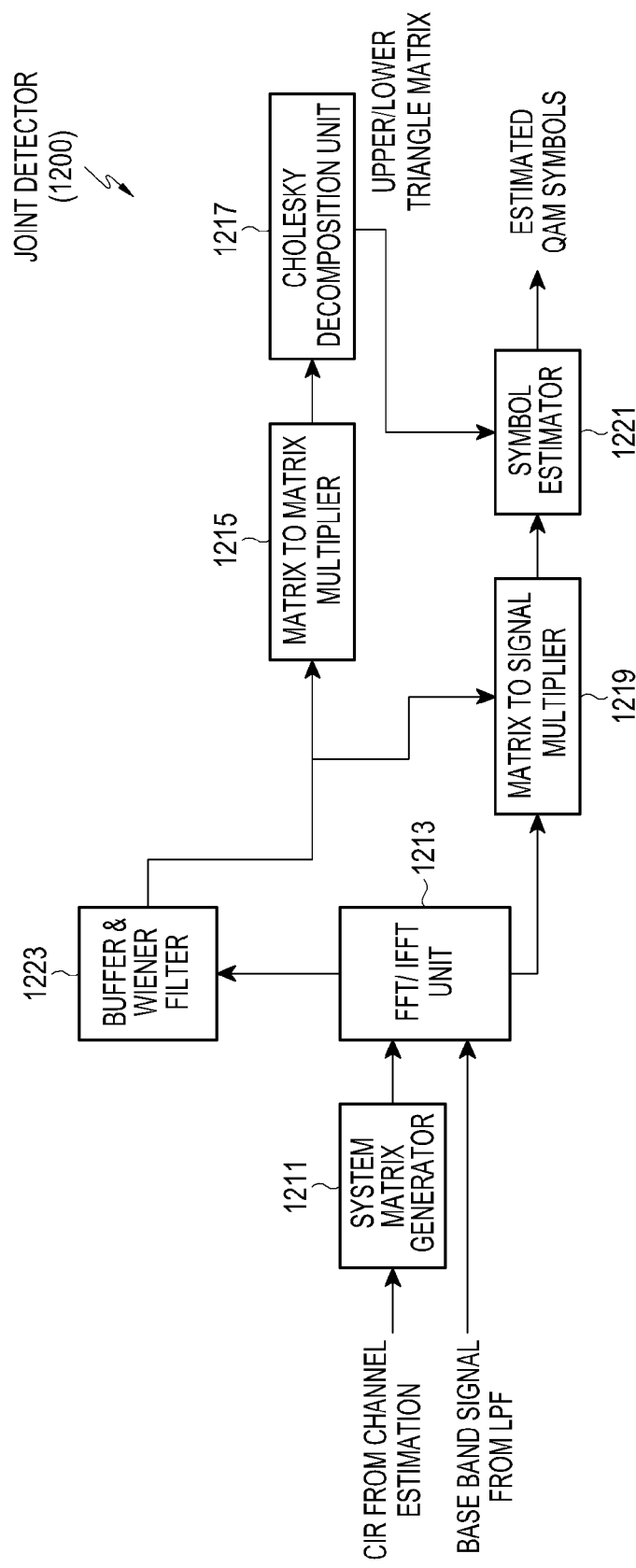
FIG. 12 is a diagram illustrating an inner structure of a joint detector based on the first JD scheme in a communication system supporting a TDD-CDMA scheme, according to an embodiment of the present disclosure.

FIG. 12 is a diagram illustrating an inner structure of a joint detector 1200 based on the first JD scheme in a communication system supporting a TDD-CDMA scheme, according to an embodiment of the present disclosure.

Referring to FIG. 12, the joint detector 1200 includes a system matrix generator 1211, an FFT/IFFT unit 1213, a matrix to matrix multiplier 1215, a Cholesky decomposition unit 1217, a matrix to signal multiplier 1219, a symbol estimator 1221, and a buffer and Wiener filter 1223.

A CIR output from a channel estimator included in a signal receiving apparatus is input to the system matrix generator 1211. The system matrix generator 1211 generates a system matrix based on the CIR, and outputs the generated system matrix to the FFT/IFFT unit 1213.

A base band signal output from an LPF included in the signal receiving apparatus is input to the FFT/IFFT unit 1213. The FFT/IFFT unit 1213 performs an FFT operation on the system matrix output from the system matrix generator 1211 and the base band signal output from the LPF to generate a frequency domain signal, and outputs the frequency domain signal to the buffer & Wiener filter 1223 and the matrix to signal multiplier 1219.

The buffer and Wiener filter 1223 generates block diagonal matrices based on the frequency domain signal output from the FFT/IFFT unit 1213 and the first JD scheme, and outputs the block diagonal matrices to the matrix to matrix multiplier 1215 and the matrix to signal multiplier 1219. The buffer and Wiener filter 1223 buffers block diagonal matrices of a time slot prior to a related time slot and block diagonal matrices of the related time slot.

The matrix to matrix multiplier 1215 performs a multiplication operation from among block diagonal matrices on the block diagonal matrices output from the buffer and Wiener filter 1223 to generate a matrix multiplication, and outputs the generated matrix multiplication to the Cholesky decomposition unit 1217.

The matrix to signal multiplier 1219 performs a multiplication operation on the frequency domain signal output from the FFT/IFFT unit 1213 and the block diagonal matrices output from the buffer and Wiener filter 1223 to generate a signal, and outputs the generated signal to the symbol estimator 1221.

The Cholesky decomposition unit 1217 applies a Cholesky decomposition scheme to the matrix multiplication output from the matrix to matrix multiplier 1215 to generate an upper triangle matrix and a lower triangle matrix, and outputs the generated upper triangle matrix and lower triangle matrix to the symbol estimator 1221.

The symbol estimator 1221 estimates QAM symbols based on the upper triangle matrix and the lower triangle matrix output from the Cholesky decomposition unit 1217 and the signal output from the matrix to signal multiplier 1219. For example, the symbol estimator 1221 may be implemented based on a forward/backward substitution scheme.

While the system matrix generator 1211, the FFT/IFFT unit 1213, the matrix to matrix multiplier 1215, the Cholesky decomposition unit 1217, the matrix to signal multiplier 1219, the symbol estimator 1221, and the buffer and Wiener filter 1223 are described as separate units, it is to be understood that this is merely for convenience of description. In other words, two or more of the system matrix generator 1211, the FFT/IFFT unit 1213, the matrix to matrix multiplier 1215, the Cholesky decomposition unit 1217, the matrix to signal multiplier 1219, the symbol estimator 1221, and the buffer and Wiener filter 1223 may be incorporated into a single unit, e.g., incorporated into an SoC.

The second JD scheme will be described with reference to FIGS. 13 and 14.

If a joint detector uses the first JD scheme, the joint detector may decrease the number of FFT computations necessary for block diagonal matrix generation. However, in the first JD scheme, it may be difficult for decreasing processing computation amount for a multiplication among block diagonal matrices and a Cholesky decomposition, which is most of processing computation amount necessary for performing a signal detecting operation in the joint detector.

In the second JD scheme, an interpolation scheme for a multiplication among block diagonal matrices is considered. That is, the second JD scheme is a JD scheme which is based on an interpolation scheme for a multiplication from among block diagonal matrices for a related time slot, i.e., a matrix $\Lambda_1$, a matrix $\Lambda_2$, a matrix $\Lambda_3$, . . . , a matrix $\Lambda_N$.

If it is assumed that values of elements included in block diagonal matrices are similar in the first JD scheme, it may be assumed that $\Lambda^H \Lambda$ has also similar values for block diagonal matrices which are neighbor in a frequency/time domain.

This means that a matrix $\Lambda$ may maintain coherence, i.e., filtering based estimation or interpolation is possible, after the matrix $\Lambda$ is multiplied by a Hermitian of the matrix $\Lambda$. In this case, a joint detector performs a filtering computation using Equation (18):

$$\Lambda_{P,n}^H \Lambda_{P,n} = \left( \sum_{i=1}^{N} a_{P,i} \Lambda_{P,i}^H \Lambda_{P,i} \right) + \left( \sum_{i=1}^{N} a_{P+1,i} \Lambda_{P+1,i}^H \Lambda_{P+1,i} \right) \tag{18}$$

Figure 13:
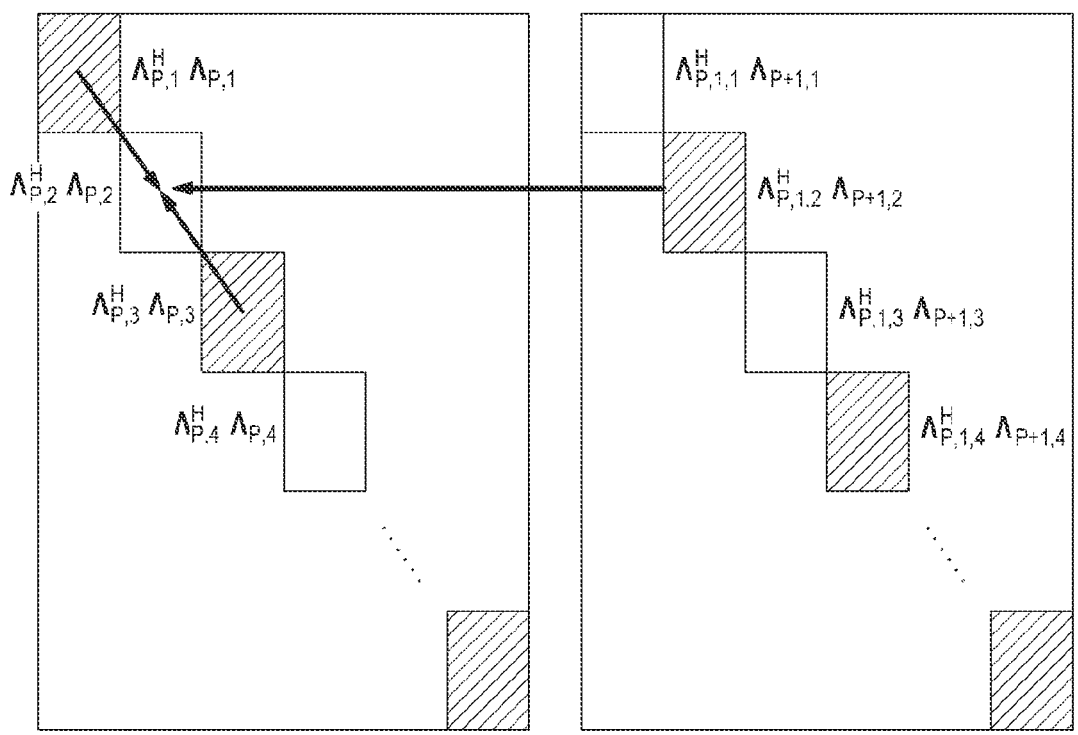
FIG. 13 is a diagram illustrating an interpolation process for multiplication from among block diagonal matrices which is performed in the second JD scheme in a communication system supporting a TDD-CDMA scheme, according to an embodiment of the present disclosure.

FIG. 13 is a diagram illustrating an interpolation process for a multiplication among block diagonal matrices which is performed in the second JD scheme in a communication system supporting a TDD-CDMA scheme, according to an embodiment of the present disclosure.

Referring to FIG. 13, a joint detector computes matrix multiplications, i.e., $\Lambda_{P,1}^H \Lambda_{P,1}$, $\Lambda_{P,3}^H \Lambda_{P,3}$, . . . , from among odd-numbered block diagonal matrices from among block diagonal matrices included in a time slot #P, i.e., a matrix $\Lambda_{P,1}$, a matrix $\Lambda_{P,3}$, . . . , and Hermitians of the matrix $\Lambda_{P,1}$, the matrix $\Lambda_{P,3}$, . . . , i.e., a Hermitian of the matrix $\Lambda_{P,1} \Lambda_{P,1}^H$, a Hermitian of the matrix $\Lambda_{P,3} \Lambda_{P,3}^H$, . . . .

The joint detector generates remaining matrix multiplications except for the matrix multiplication $\Lambda_{P,1}^H \Lambda_{P,1}$, the matrix multiplication $\Lambda_{P,3}^H \Lambda_{P,3}$, . . . , by interpolating the matrix multiplication $\Lambda_{P,1}^H \Lambda_{P,1}$, the matrix multiplication $\Lambda_{P,3}^H \Lambda_{P,3}$, . . . . In this way, the joint detector detects matrix multiplications for all of the block diagonal matrices by performing an interpolation process for matrix multiplications from among the block diagonal matrices instead of performing a multiplication operation on all of the block diagonal matrices.

As shown in FIG. 13, upon using the second JD scheme, the joint detector decreases processing computation amounts necessary for matrix multiplication generation for block diagonal matrices.

Figure 14:
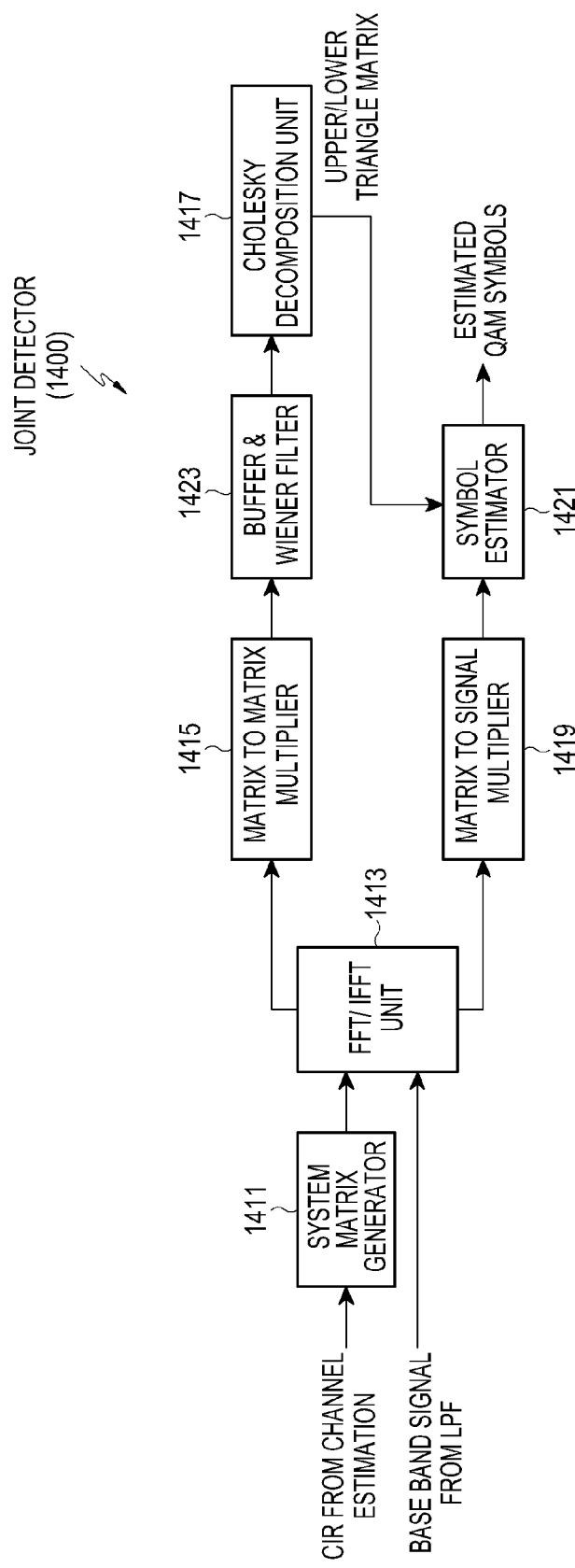
FIG. 14 is a diagram illustrating an inner structure of a joint detector based on the second JD scheme in a communication system supporting a TDD-CDMA scheme, according to an embodiment of the present disclosure.

FIG. 14 is a diagram illustrating an inner structure of a joint detector 1400 based on the second JD scheme in a communication system supporting a TDD-CDMA scheme, according to an embodiment of the present disclosure.

Referring to FIG. 14, the joint detector 1400 includes a system matrix generator 1411, an FFT/IFFT unit 1413, a matrix to matrix multiplier 1415, a Cholesky decomposition unit 1417, a matrix to signal multiplier 1419, a symbol estimator 1421, and a buffer and Wiener filter 1423.

A CIR output from a channel estimator included in a signal receiving apparatus is input to the system matrix generator 1411. The system matrix generator 1411 generates a system matrix based on the CIR, and outputs the generated system matrix to the FFT/IFFT unit 1413.

A base band signal output from an LPF included in the signal receiving apparatus is input to the FFT/IFFT unit 1413. The FFT/IFFT unit 1413 performs an FFT operation on the system matrix output from the system matrix generator 1411 and the base band signal output from the LPF to generate a frequency domain signal, and outputs the frequency domain signal to the matrix to matrix multiplier 1415 and the matrix to signal multiplier 1419.

The matrix to matrix multiplier 1415 detects block diagonal matrices based on the frequency domain signal output from the FFF/IFFT unit 1413, generates a matrix multiplication by performing a multiplication operation from among the block diagonal matrices, and outputs the generated matrix multiplication to the buffer and Wiener filter 1423. The buffer and Wiener filter 1423 generates matrix multiplications for the matrix multiplication output from the matrix to matrix multiplier 1415 based on the second JD schemes, and outputs the generated matrix multiplications to the Cholesky decomposition unit 1417. The buffer and Wiener filter 1423 buffers a matrix multiplication for a time slot which is prior to a related time slot and a matrix multiplication for the related time slot.

The matrix to signal multiplier 1419 performs a multiplication operation between the frequency domain signal output from the FFF/IFFT unit 1413 and a matrix which is diagonalized to generate a signal, and outputs the generated signal to the symbol estimator 1421.

The Cholesky decomposition unit 1417 applies a Cholesky decomposition scheme to the matrix multiplication output from the buffer and Wiener filter 1423 to generate an upper triangle matrix and a lower triangle matrix, and outputs the generated upper triangle matrix and lower triangle matrix to the symbol estimator 1421.

The symbol estimator 1421 estimates QAM symbols based on the upper triangle matrix and the lower triangle matrix output from the Cholesky decomposition unit 1417 and the signal output from the matrix to signal multiplier 1419. For example, the symbol estimator 1421 may be implemented based on a forward/backward substitution scheme.

While the system matrix generator 1411, the FFT/IFFT unit 1413, the matrix to matrix multiplier 1415, the Cholesky decomposition unit 1417, the matrix to signal multiplier 1419, the symbol estimator 1421, and the buffer and Wiener filter 1423 are described as separate units, it is to be understood that this is merely for convenience of description. In other words, two or more of the system matrix generator 1411, the FFT/IFFT unit 1413, the matrix to matrix multiplier 1415, the Cholesky decomposition unit 1417, the matrix to signal multiplier 1419, the symbol estimator 1421, and the buffer and Wiener filter 1423 may be incorporated into a single unit, e.g., incorporated on an SoC.

The third JD scheme will be described with reference to FIGS. 15 and 16.

The third JD scheme is a JD scheme which is based on an interpolation scheme for Cholesky decomposition matrices of a related time slot.

An upper triangle matrix $L_n$ and a lower triangle matrix $U_n$ which are acquired by performing a Cholesky decomposition operation on a $\Lambda_n^H \Lambda_n$ matrix are generated. Here, upper triangle matrices for neighbor block diagonal matrices have similar element values, and lower triangle matrices for the neighbor block diagonal matrices also have similar element values.

A signal detecting operation which is based on the third JD scheme may decrease processing computation amount due to Cholesky decomposition, as well as processing computation amount due to Wiener filtering, or interference, and the third JD scheme may be expressed using Equation (19).

$$L_{P,n} = \left(\sum_{i=1}^{N} a_{P,i} L_{P,i}\right) + \left(\sum_{i=1}^{N} a_{P+1,i} L_{P+1,i}\right) \quad (19)$$

$$U_{P,n} = \left(\sum_{i=1}^{N} a_{P,i} U_{P,i}\right) + \left(\sum_{i=1}^{N} a_{P+1,i} U_{P+1,i}\right)$$

Figure 15:
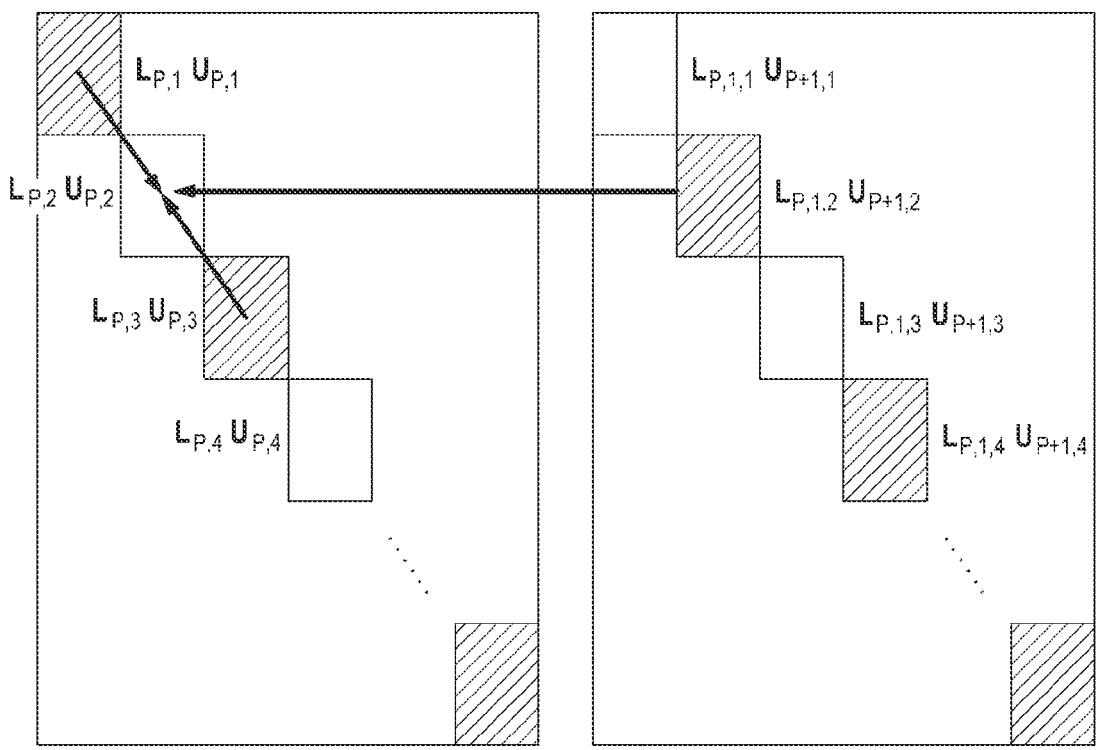
FIG. 15 is a diagram illustrating an interpolation method for Cholesky decomposition matrices which is performed in a third JD scheme in a communication system supporting a TDD-CDMA scheme, according to an embodiment of the present disclosure.

FIG. 15 is a diagram illustrating an interpolation method for Cholesky decomposition matrices which is performed in the third JD scheme in a communication system supporting a TDD-CDMA scheme, according to an embodiment of the present disclosure.

Referring to FIG. 15, a joint detector computes only an odd-numbered lower triangle matrix $L_n$ and an odd-numbered upper triangle matrix $U_n$, i.e., a lower triangle matrix $L_{P,1}$ and an upper triangle matrix $U_{P,1}$, a lower triangle matrix $L_{P,3}$ and an upper triangle matrix $U_{P,3}$, . . . , among lower triangle matrices and upper triangle matrices related to a time slot #P.

The joint detector generates remaining lower triangle matrices and upper triangle matrices except for the lower triangle matrix $L_{P,1}$ and the upper triangle matrix $U_{P,1}$, the lower triangle matrix $L_{P,3}$ and the upper triangle matrix $U_{P,3}$, . . . , by interpolating the lower triangle matrix $L_{P,1}$ and the upper triangle matrix $U_{P,1}$, the lower triangle matrix $L_{P,3}$ and the upper triangle matrix $U_{P,3}$, . . . . In this way, the joint detector may use Cholesky decomposition matrices by performing an interpolation process for the Cholesky decomposition matrices instead of computing all Cholesky decomposition matrices.

As described in FIG. 15, if the third JD scheme is used, the joint detector may decrease a processing computation amount necessary for generating Cholesky decomposition matrices.

Figure 16:
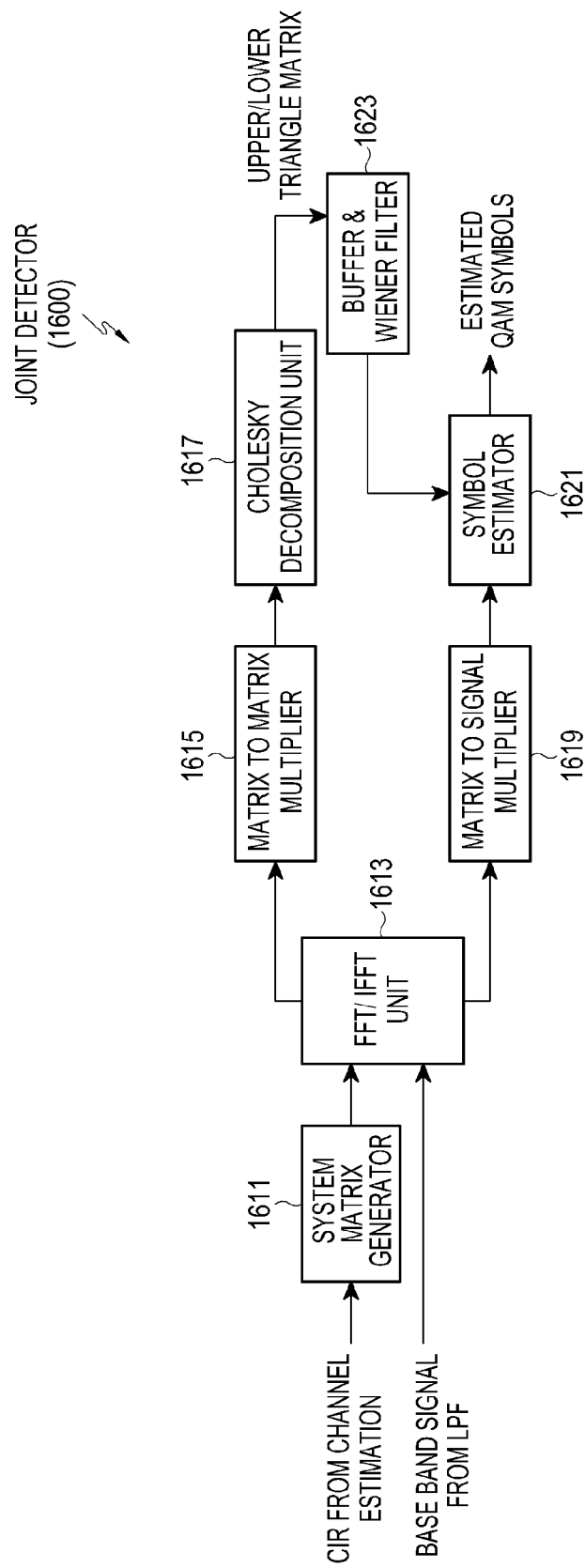
FIG. 16 is a diagram illustrating an inner structure of a joint detector based on the third JD scheme in a communication system supporting a TDD-CDMA scheme, according to an embodiment of the present disclosure.

FIG. 16 is a diagram illustrating an inner structure of a joint detector 1600 based on the third JD scheme in a communication system supporting a TDD-CDMA scheme, according to an embodiment of the present disclosure.

Referring to FIG. 16, the joint detector 1600 includes a system matrix generator 1611, an FFT/IFFT unit 1613, a matrix to matrix multiplier 1615, a Cholesky decomposition unit 1617, a matrix to signal multiplier 1619, a symbol estimator 1621, and a buffer and Wiener filter 1623.

A CIR output from a channel estimator included in a signal receiving apparatus is input to the system matrix generator 1611. The system matrix generator 1611 generates a system matrix based on the CIR, and outputs the generated system matrix to the FFT/IFFT unit 1613.

A base band signal output from an LPF included in the signal receiving apparatus is input to the FFT/IFFT unit 1613. The FFT/IFFT unit 1613 performs an FFT operation on the system matrix output from the system matrix generator 1611 and the base band signal output from the LPF to generate a frequency domain signal, and outputs the frequency domain signal to the matrix to matrix multiplier 1615 and the matrix to signal multiplier 1619.

The matrix to matrix multiplier 1615 detects block diagonal matrices based on the frequency domain signal output from the FFF/IFFT unit 1613, generates a matrix multiplication by performing a multiplication operation among the block diagonal matrices, and outputs the generated matrix multiplication to the Cholesky decomposition unit 1617. The matrix to signal multiplier 1619 generates a signal by performing a multiplication operation between the frequency domain signal output from the FFT/IFFT unit 1613 and the diagonalized matrix, and outputs the signal to the symbol estimator 1621.

The Cholesky decomposition unit 1617 applies a Cholesky decomposition scheme to the matrix multiplication output from the matrix to matrix multiplier 1615 to generate an upper triangle matrix and a lower triangle matrix, and outputs the generated upper triangle matrix and the generated lower triangle matrix to the buffer and Wiener filter 1623. The buffer and Wiener filter 1623 generates an upper triangle matrix and a lower triangle matrix based on the upper triangle matrix and the lower triangle matrix output from the Cholesky decomposition unit 1617, and the third JD scheme, and outputs the generated upper triangle matrix and the generated lower triangle matrix to the symbol estimator 1621.

The symbol estimator 1621 estimates QAM symbols based on the upper triangle matrix and the lower triangle matrix output from the buffer and Wiener filter 1623 and the signal output from the matrix to signal multiplier 1619. For example, the symbol estimator 1621 may be implemented based on a forward/backward substitution scheme.

While the system matrix generator 1611, the FFT/IFFT unit 1613, the matrix to matrix multiplier 1615, the Cholesky decomposition unit 1617, the matrix to signal multiplier 1619, the symbol estimator 1621, and the buffer and Wiener filter 1623 are described as separate units, it is to be understood that this is merely for convenience of description. In other words, two or more of the system matrix generator 1611, the FFT/IFFT unit 1613, the matrix to matrix multiplier 1615, the Cholesky decomposition unit 1617, the matrix to signal multiplier 1619, the symbol estimator 1621, and the buffer and Wiener filter 1623 may be incorporated into a single unit, e.g., incorporated into an SoC.

The third JD scheme has been described with reference to FIGS. 15 and 16, effect of a processing computation amount decrease for the first JD scheme to the third JD scheme will be described with reference to Tables 1 and 2.

First, processing computation amount in a case where a signal detecting method is performed in a communication system supporting a conventional TDD-CDMA scheme will be described with reference to Table 1.

TABLE 1

| | JD processing computation amount necessary for processing one data block | | | |
|---|---|---|---|---|
| | the number of necessary complex multiplications | the number of necessary complex additions | the number of estimated complex multiplications | the number of estimated complex additions |
| active code detection | N*K*M(2Q + 2W − 1) | N*K*(M*(2Q + 2W − 1) − 1) | 49984 | 49280 |
| diagonal matrix generation | 2*M*Q*K*(24*4 + 96) | 2*M*Q*K*(24*2 + 128 + 128) | 98304 | 155648 |
| FFT | 2*3*2*M*Q*(24*4 + 96) | 2*3*2*M*Q*(24*2 + 128 + 128) | 36864 | 58368 |
| signal vector generation | 2*3*2*M*Q | 2*3*K*K | 192 | 1536 |
| Cholesky decomposition | 16*12060 | 16*8847 | 192960 | 4096 |
| IFFT and substitution | 2*3*2*M*Q*(24*4 + 96) | 2*3*2*M*Q*(24*2 + 128 + 128) | 36864 | 58368 |
| total | N/A | N/A | 415168 | 327296 |

As illustrated in Table 1, a case where the number of modulation symbols which are transmitted based on each channelization code is 22 (N=22), the number of channelization codes is 16 (K=16), and a signal receiving apparatus uses one receiving antenna, a spreading factor is 16 (Q=16) in the communication system supporting the TDD-CDMA scheme, i.e., the number of complex multiplications and the number of complex additions.

As illustrated in Table 1, N*K*M(2Q+2W−1) complex multiplications and N*K*(M*(2Q+2W−1)−1) complex additions are performed for active code detection, 2*M*Q*K*(24*4+96) complex multiplications and 2*M*Q*K*(24*2+128+128) complex additions are performed for diagonal matrix generation, 2*3*2*M*Q*(24*4+96) complex multiplications and 2*3*2*M*Q*(24*2+128+128) complex additions are performed for FFT, 2*3*2*M*Q complex multiplications and 2*3*K*K complex additions are performed for signal vector generation, 16*12060 complex multiplications and 16*8847 complex additions are performed for Cholesky decomposition, and 2*3*2*M*Q*(24*4+96) complex multiplications and 2*3*2*M*Q*(24*2+128+128) complex additions are performed for IFFT and substitution.

Second, processing computation amount in a case where a signal detecting operation is performed in a communication system supporting a TDD-CDMA scheme according to an embodiment of the present disclosure will be described with reference to Table 2.

TABLE 2

JD processing computation amount necessary for processing one data block

| | the number of necessary complex multiplications | the number of necessary complex additions | the number of estimated complex multiplications | the number of estimated complex additions |
|---|---|---|---|---|
| active code detection | N*K*M(2Q + 2W − 1) | N*K*(M*(2Q + 2W − 1) − 1) | 49984 | 49280 |
| diagonal matrix generation | 2*M*Q*K*(24*4 + 96)/2 | 2*M*Q*K*(24*2 + 128 + 128)/2 | 49152 | 77824 |
| FFT | 2*3*2*M*Q*(24*4 + 96)/2 | 2*3*2*M*Q*(24*2 + 128 + 128)/2 | 18342 | 29184 |
| signal vector generation | 2*3*2*M*Q | 2*3*K*K | 192 | 1536 |
| Cholesky decomposition | 16*12060/2 | 16*8847/2 | 96480 | 2048 |
| IFFT and substitution | 2*3*2*M*Q*(24*4 + 96) | 2*3*2*M*Q*(24*2 + 128 + 128) | 36864 | 58368 |
| total | N/A | N/A | 251104 | 218240 |

As illustrated in Table 2, in a case where the number of modulation symbols which are transmitted based on each channelization code is 22 (N=22), the number of channelization codes is 16 (K=16), and a signal receiving apparatus uses one receiving antenna, a spreading factor is 16 (Q=16) in the communication system supporting the TDD-CDMA scheme, i.e., the number of complex multiplications and the number of complex additions.

Specifically, processing computation amount in Table 2 shows processing computation amount in a case where a signal detecting operation based on the third JD scheme is performed.

As illustrated in Table 2, N*K*M(2Q+2W−1) complex multiplications and N*K*(M*(2Q+2W−1)−1) complex additions are performed for active code detection, 2*M*Q*K*(24*4+96)/2 complex multiplications and 2*M*Q*K*(24*2+128+128)/2 complex additions are performed for diagonal matrix generation, 2*3*2*M*Q*(24*4+96)/2 complex multiplications and 2*3*2*M*Q*(24*2+128+128)/2 complex additions are performed for FFT, 2*3*2*M*Q complex multiplications and 2*3*K*K complex additions are performed for signal vector generation, 16*12060/2 complex multiplications and 16*8847/2 complex additions are performed for Cholesky decomposition, and 2*3*2*M*Q*(24*4+96) complex multiplications and 2*3*2*M*Q*(24*2+128+128) complex additions are performed for IFFT and substitution.

As illustrated in Table 2, if a signal detecting operation based on the third JD scheme is performed, a processing computation amount with about a 40% decrease can be obtained when compared to a case where a signal detecting operation based on a conventional JD scheme is performed.

Further, in a case where one time slot is used, an interpolation scheme is used instead of a Wiener filter, and one of two block matrices is computed.

One factor which is considered in a case where the first JD scheme is used instead of the third JD scheme is whether there is performance degradation due to interference or filtering.

BLER performance in a communication system supporting a TDD-CDMA scheme according to an embodiment of the present disclosure will be described with reference to FIGS. 17-20.

Figure 17:
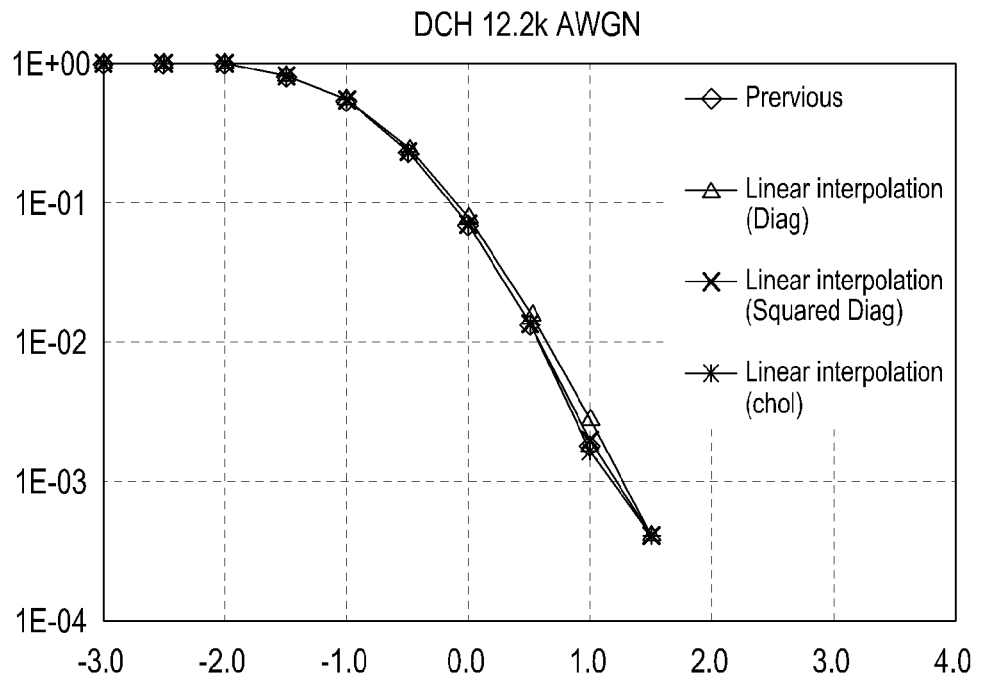
FIG. 17 is a graph illustrating an example of block error rate (BLER) performance in a communication system supporting a TDD-CDMA scheme, according to an embodiment of the present disclosure.

FIG. 17 is a diagram illustrating an example of BLER performance in a communication system supporting a TDD-CDMA scheme, according to an embodiment of the present disclosure.

Referring to FIG. 17, BLER performance for a dedicated channel (DCH) 12.2 kbps voice channel in an additive white Gaussian noise (AWGN) channel environment, which is defined in TS 25.102 as a TD-SCDMA 3GPP standard, is shown. A detailed description of the AWGN channel environment will be omitted herein.

In FIG. 17, BLER performance represented as 'Previous' shows BLER performance in a case where a signal detecting operation based on a conventional JD scheme is performed, BLER performance represented as 'Liner interpolation (Diag)' shows BLER performance in a case where a signal detecting operation based on the first JD schemeis performed, BLER performance represented as 'Liner interpolation (Squared Diag)' shows BLER performance in a case where a signal detecting operation based on the second JD scheme is performed, and BLER performance represented as 'Liner interpolation (Chol)' shows BLER performance in a case where a signal detecting operation based on the third JD scheme is performed.

As illustrated in FIG. 17, BLER performance which is based on each of the first JD scheme to the third JD scheme is not degraded when compared to BLER performance which is based on a conventional JD scheme in AWGN channel environment.

Figure 18:
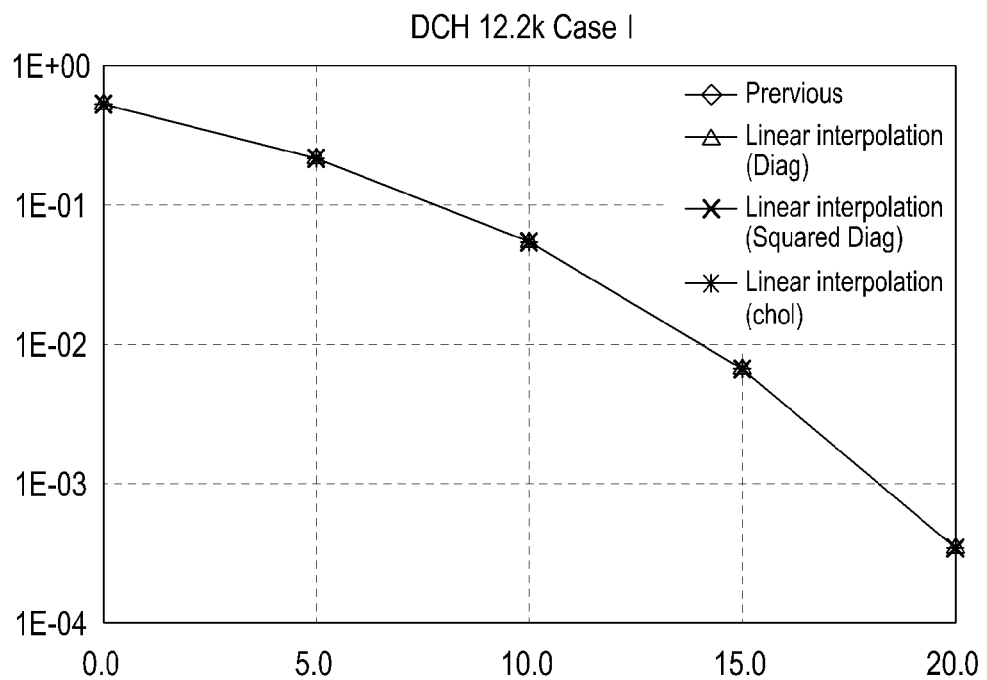
FIG. 18 is a graph illustrating another example of BLER performance in a communication system supporting a TDD-CDMA scheme, according to an embodiment of the present disclosure.

FIG. 18 is a diagram illustrating another example of BLER performance in a communication system supporting a TDD-CDMA scheme, according to an embodiment of the present disclosure.

Referring to FIG. 18, BLER performance for a DCH 12.2 kbps voice channel in multipath fading case 1 channel environment, which is defined in TS 25.102 as a TD-SCDMA 3GPP standard, is shown. A detailed description of the multipath fading case 1 channel environment will be omitted herein.

In FIG. 18, BLER performance represented as 'Previous' shows BLER performance in a case where a signal detecting operation based on a conventional JD scheme is performed, BLER performance represented as 'Liner interpolation (Diag)' shows BLER performance in a case where a signal detecting operation based on the first JD scheme is performed, BLER performance represented as 'Liner interpolation (Squared Diag)' shows BLER performance in a case where a signal detecting operation based on the second JD scheme is performed, and BLER performance represented as 'Liner interpolation (Chol)' shows BLER performance in a case where a signal detecting operation based on the third JD scheme is performed.

As illustrated in FIG. 18, BLER performance which is based on each of the first JD scheme to the third JD scheme is not degraded when compared to BLER performance which is based on a conventional JD scheme in multipath fading case 1 channel environment.

Figure 19:
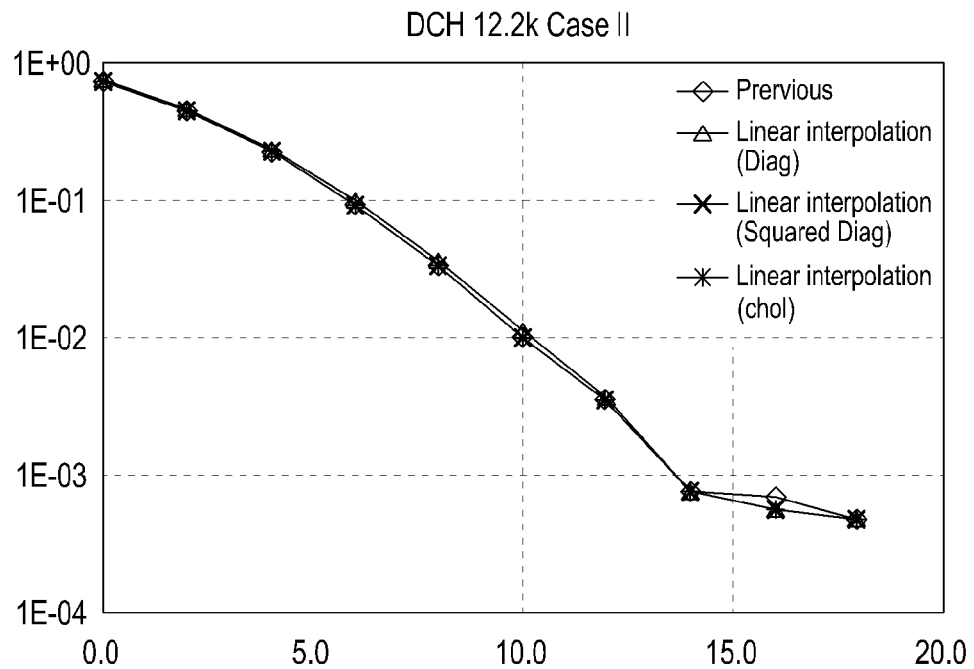
FIG. 19 is a graph illustrating another example of BLER performance in a communication system supporting a TDD-CDMA scheme, according to an embodiment of the present disclosure.

FIG. 19 is a diagram illustrating another example of BLER performance in a communication system supporting a TDD-CDMA scheme, according to an embodiment of the present disclosure.

Referring to FIG. 19, BLER performance for a DCH 12.2 kbps voice channel in multipath fading case 2 channel environment, which is defined in TS 25.102 as a TD-SCDMA 3GPP standard, is shown. A detailed description of the multipath fading case 2 channel environment will be omitted herein.

In FIG. 19, BLER performance represented as 'Previous' shows BLER performance in a case where a signal detecting operation based on a conventional JD scheme is performed, BLER performance represented as 'Liner interpolation (Diag)' shows BLER performance in a case where a signal detecting operation based on the first JD scheme is performed, BLER performance represented as 'Liner interpolation (Squared Diag)' shows BLER performance in a case where a signal detecting operation based on the second JD scheme is performed, and BLER performance represented as 'Liner interpolation (Chol)' shows BLER performance in a case where a signal detecting operation based on the third JD scheme is performed.

As illustrated in FIG. 19, BLER performance which is based on each of the first JD scheme to the third JD scheme is not degraded when compared to BLER performance which is based on a conventional JD scheme in multipath fading case 2 channel environment.

Figure 20:
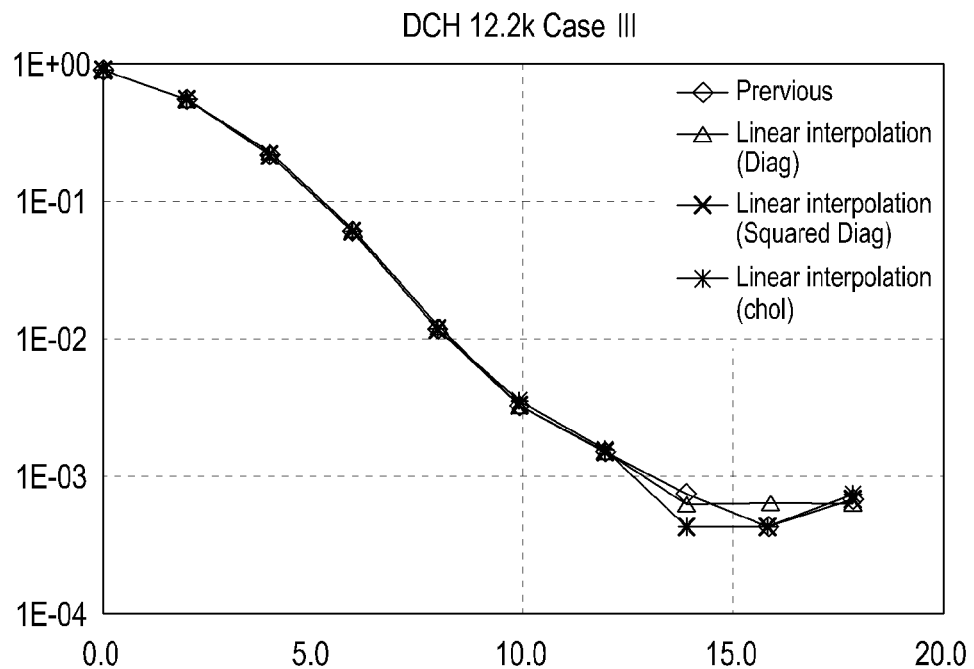
FIG. 20 is a graph illustrating another example of BLER performance in a communication system supporting a TDD-CDMA scheme according to an embodiment of the present disclosure.

FIG. 20 is a diagram illustrating another example of BLER performance in a communication system supporting a TDD-CDMA scheme according to an embodiment of the present disclosure.

Referring to FIG. 20, BLER performance for a DCH 12.2 kbps voice channel in multipath fading case 3 channel environment, which is defined in TS 25.102 as a TD-SCDMA 3GPP standard, is shown. A detailed description of the multipath fading case 3 channel environment will be omitted herein.

In FIG. 20, BLER performance represented as 'Previous' shows BLER performance in a case where a signal detecting operation based on a conventional JD scheme is performed, BLER performance represented as 'Liner interpolation (Diag)' shows BLER performance in a case where a signal detecting operation based on the first JD scheme is performed, BLER performance represented as 'Liner interpolation (Squared Diag)' shows BLER performance in a case where a signal detecting operation based on the second JD scheme is performed, and BLER performance represented as 'Liner interpolation (Chol)' shows BLER performance in a case where a signal detecting operation based on the third JD scheme is performed.

As illustrated in FIG. 20, BLER performance which is based on each of the first JD scheme to the third JD scheme is not degraded when compared to BLER performance which is based on a conventional JD scheme in multipath fading case 3 channel environment.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device, which is connected to the apparatus via a wired or a wireless connection, and store the program. The program providing device may include a memory for storing instructions which instruct the apparatus to perform a content protect method, which has been already installed on the apparatus, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for detecting a signal by a signal receiving apparatus in a communication system, the method comprising:

detecting, by a joint detector of a signal receiving apparatus, a part of block diagonal matrices included in a diagonal matrix based on at least one channel impulse response (CIR) for a received signal;

detecting, by the joint detector, remaining block diagonal matrices excluding the part of block diagonal matrices from among block diagonal matrices included in the diagonal matrix;

estimating, by the joint detector, modulation symbols from the received signal based on the diagonal matrix;

generating, by the joint detector, a block diagonal matrix by multiplying one of second matrices by a fast Fourier transform (FFT) matrix, wherein the second matrices are included in a first matrix, which is generated by applying a circular extension scheme to a fourth matrix including third matrices;

generating, by the joint detector, a third matrix for one of the estimated modulation symbols, the third matrix includes vectors for channelization codes, which are used in the communication system; and generating, by the joint detector, a vector based on the channelization codes or the at least one CIR.

2. The method of claim 1, wherein detecting the remaining block diagonal matrices excluding the part of block diagonal matrices further comprises interpolating the detected remaining block diagonal matrices.

3. The method of claim 1, wherein detecting the remaining block diagonal matrices excluding the part of block diagonal matrices further comprises performing a minimum mean squared error (MMSE) estimation operation on the detected remaining block diagonal matrices.

4. The method of claim 1, wherein the part of block diagonal matrices is provided for a related time slot.

5. The method of claim 1, wherein the part of block diagonal matrices includes a part of block diagonal matrices for a related time slot and a part of block diagonal matrices for at least one time slot other than the related time slot.

6. The method of claim 1, wherein the vector is obtained using a convolution computation on the channelization codes and the at least one CIR.

7. A method for detecting a signal by a signal receiving apparatus in a communication system, the method comprising:

detecting, by a joint detector of a signal receiving apparatus, matrix multiplications, which are generated by multiplying a part of block diagonal matrices included in a diagonal matrix using Hermitian multiplication of the part of block diagonal matrices, based on at least one channel impulse response (CIR) for a received signal;

detecting, by the joint detector, matrix multiplications, which are generated by multiplying remaining block diagonal matrices excluding the part of block diagonal matrices from among block diagonal matrices included in the diagonal matrix using Hermitian multiplication of the remaining block diagonal matrices;

estimating, by the joint detector, modulation symbols from the received signal based on the matrix multiplications, generating, by the joint detector, a block diagonal matrix by multiplying one of second matrices by a fast Fourier transform (FFT) matrix, wherein the second matrices are included in a first matrix, which is generated by applying a circular extension scheme to a fourth matrix including third matrices;

generating, by the joint detector, a third matrix for one of the modulation symbols, the third matrix includes vectors for channelization codes, which are used in the communication system; and generating, by the joint detector, a vector based on the channelization codes or the at least one CIR.

8. The method of claim 7, wherein detecting the matrix multiplications, which are generated by multiplying the remaining block diagonal matrices excluding the part of block diagonal matrices, further comprises interpolating the detected matrix multiplications that are generated by multiplying the remaining block diagonal matrices.

9. The method of claim 7, wherein detecting the matrix multiplications which are generated by multiplying the remaining block diagonal matrices excluding the part of block diagonal matrices further comprises performing a minimum mean squared error (MMSE) estimation operation on the detected matrix multiplications that are generated by multiplying the remaining block diagonal matrices.

10. The method of claim 7, wherein the part of block diagonal matrices is provided for a related time slot.

11. The method of claim 7, wherein the part of block diagonal matrices includes a part of block diagonal matrices for a related time slot and a part of block diagonal matrices for at least one time slot other than the related time slot.

12. The method of claim 7, wherein the vector is obtained using a convolution computation on the channelization codes and the at least one CIR.

13. A signal receiving apparatus in a communication system, the signal receiving apparatus comprising:

a joint detector configured to:
  detect a part of block diagonal matrices included in a diagonal matrix based on at least one channel impulse response (CIR) for a received signal, detect remaining block diagonal matrices excluding the part of block diagonal matrices from among block diagonal matrices of the diagonal matrix, estimate modulation symbols from the received signal based on the diagonal matrix,
  generate a block diagonal matrix by multiplying one of second matrices by a fast Fourier transform (FFT) matrix, wherein the second matrices are included in a first matrix, which is generated by applying a circular extension scheme to a fourth matrix including third matrices,
  generate a third matrix for one of the modulation symbols, the third matrix includes vectors for channelization codes, which are used in the communication system, and
  generate a vector based on the channelization codes or the at least one CIR.

14. The signal receiving apparatus of claim 13, wherein the joint detector is further configured to interpolate the detected remaining block diagonal matrices.

15. The signal receiving apparatus of claim 13, wherein the joint detector is further configured to perform a minimum mean squared error (MMSE) estimation operation on the detected remaining block diagonal matrices.

16. The signal receiving apparatus of claim 13, wherein the part of block diagonal matrices is provided for a related time slot.

17. The signal receiving apparatus of claim 13, wherein the part of block diagonal matrices includes a part of block diagonal matrices for a related time slot and a part of block diagonal matrices for at least one time slot other than the related time slot.

18. The signal receiving apparatus of claim 13, wherein the vector is obtained using a convolution computation on the channelization codes and the at least one CIR.

* * * * *